(12) United States Patent
Guedon et al.

(10) Patent No.: US 9,767,235 B2
(45) Date of Patent: Sep. 19, 2017

(54) METHOD AND DEVICE FOR THE DESIGN OF THERMAL MODELS FOR ELECTRONIC SYSTEMS

(75) Inventors: Stephane Guedon, Saint Jean de Moirans (FR); Nicolas Peltier, Tullins (FR); Sylvian Kaiser, Voiron (FR); Olivier Martins, Saint Martins d'Heres (FR)

(73) Assignee: Intel Corporation, Santa Clara, CA (US)

( * ) Notice: Subject to any disclaimer, the term of this patent is extended or adjusted under 35 U.S.C. 154(b) by 694 days.

(21) Appl. No.: 13/278,381

(22) Filed: Oct. 21, 2011

(65) Prior Publication Data

US 2012/0116735 A1    May 10, 2012

Related U.S. Application Data

(63) Continuation of application No. PCT/EP2010/055301, filed on Apr. 21, 2010.

(30) Foreign Application Priority Data

Apr. 24, 2009  (FR) ..................... 09 52693

(51) Int. Cl.
  *G06F 17/50*  (2006.01)

(52) U.S. Cl.
  CPC ...... *G06F 17/5018* (2013.01); *G06F 2217/80* (2013.01)

(58) Field of Classification Search
  CPC .. G06F 17/5009; G06F 17/5018; G06F 17/50; G06F 17/10; G06F 19/12;
(Continued)

(56) References Cited

U.S. PATENT DOCUMENTS 5,202,843 A * 4/1993 Kunimine ................. G01K 3/14
                                                            374/E3.009
5,644,687 A * 7/1997 Agonafer ............. G06F 17/5018
                                                            345/419
(Continued)

FOREIGN PATENT DOCUMENTS

WO    2007051838 A1    5/2007

OTHER PUBLICATIONS

O'Mahoney, R., Time Step and Mesh Size Dependencies in the Heat Conduction Solution of a Semi-Implict, Finite Difference Scheme for Transient Two-Phase Flow, 1992 [retrieved on Mar. 7, 2013] down loaded from http://www.nrc.gov/reading-rm/doc-collections/nuregs/agreement/ia0073/.*

(Continued)

*Primary Examiner* — Aniss Chad
*Assistant Examiner* — Brian S Cook
(74) *Attorney, Agent, or Firm* — Patent Capital Group

(57) ABSTRACT

The invention relates to a method and device for thermal simulation of electronic systems involving breaking down the system into parts being in a single material and represented as a detailed model, to form a plurality of detailed models each including at least a mesh, a heat admittance system, a heat transfer interface, a connection interface, a power multi-source interface, and a temperature measurement interface; reducing each of the detailed models into a compact model by controlling the maximum of a heat flow frequency; interpolating nodes of the heat transfer interface, connection interface, power multi-source interface, or temperature measurement interface of at least one of the detailed models and the coupling of at least two of the compact models into a macromodel; and reducing the macromodel to form a compact and flexible thermal model.

19 Claims, 15 Drawing Sheets

(58) Field of Classification Search
CPC .. G06F 19/3437; G06F 17/13; G06F 17/5045; G06F 19/704; G06F 17/18; G06F 17/5036; G06F 19/18; G06F 19/24; G06F 19/701; G06F 7/00; G06F 17/506; G06F 2217/80
USPC .................................................. 703/2, 5, 7
See application file for complete search history.

(56) References Cited

U.S. PATENT DOCUMENTS

| | | | | |
|---|---|---|---|---|
| 6,389,582 | B1* | 5/2002 | Valainis | G06F 17/5072 165/185 |
| 6,795,950 | B2* | 9/2004 | Matsushita | H05K 13/08 700/98 |
| 8,126,234 | B1* | 2/2012 | Edwards et al. | 382/128 |
| 8,390,620 | B1* | 3/2013 | Staten et al. | 345/423 |
| 2006/0031794 | A1* | 2/2006 | Li | G06F 17/5009 716/111 |
| 2008/0072182 | A1* | 3/2008 | He et al. | 716/2 |
| 2008/0133201 | A1* | 6/2008 | Guedon | 703/14 |
| 2008/0221845 | A1* | 9/2008 | Yu et al. | 703/2 |
| 2009/0015586 | A1* | 1/2009 | Im et al. | 345/423 |
| 2009/0019411 | A1* | 1/2009 | Chandra | G06F 17/5009 716/119 |
| 2009/0024347 | A1* | 1/2009 | Chandra | G06F 17/5036 702/130 |
| 2010/0174515 | A1* | 7/2010 | Madhavan et al. | 703/2 |
| 2012/0304137 | A1* | 11/2012 | Pramono | G06F 17/5036 716/109 |

OTHER PUBLICATIONS

Blomberg, T., Heat Conduction in Two and Three Dimensions: Computer Modelling of Building Physics Applications, May 1996, ISBM 91-88722-05-8, Department of Building Physics, Lund University, Sweden.*

Barti, E., Stecher, M., Using submodeling Techniques to understand passivation cracks in microelectronic devices pre-processing with ANSA, Jun. 14-15, 2007 2nd ANSA & uETA International Congress.*

Lasance, C.J.M., CFD Simiulations in Electronic Systems: A Lot of Pitfalls and a Few Remedies, 2006 retrieved from http://www.electronics-cooling.com/2005/05/cfd-simulations-in-electronic-systems-a-lot-of-pitfalls-and-a-few-remedies/.*

Bornoff, R., Improved Thermal Design of PCBs Using Surface Optimization Modeling, Printed Circuit Design & Fab, 2007, http://pcdandf.com/cms/magazine/192/3703-improved-thermal-design-of-pcbs-using-surface-optimization-modeling.*

Stehouwer, P., Design of Experiments for Numerical Parameter Studies of Electronic Systems: Optimizing the Cooling Strategy of an Ethernet Switch, Electronic Cooling, 2005, http://www.electronics-cooling.com/2005/05/design-of-experiments-for-numerical-parameter-studies-of-electronic-systems-optimizing-the-cooling-strategy-of-an-ethernet-switch/.*

M. Furmanczyk, A. Napieralski, K. Szaniawski, W. Tylman, and A. Lara, "Reduced electrothermal models for integrated circuits," in Proc. 1st Int. Conf. Model Simul. Semicond. Microsyst., 1998, pp. 139-144.*

Hoppe, H., (Progressive Meshes, 1996) Microsoft Research.*

Garland, M., Heckbert, P.S., (Surface Simplification Using Quadratic Error Metrics, 1997 Association for Computing Machinery.*

De Jong, E.C.W., Ferreira, J.A., Bauer, P., (Thermal Design Based on Surface Temperature Mapping, 2005) IEEE Power Electronics Letters, vol. 3, No. 4, Dec. 2005.*

Wang, Z.G., Mayinger, F., (Natural Convective Air Cooling of the PCBs Array in a Closed Casing, 1993) 6$^{th}$ International Symposium on Transport Phenomena in Thermal Engineeringn May 9-13, 1993, Seoul Korea.*

Benoy, D.A., (Thermal Modeling of High Power LED Modules, 2006) ISBM 2-916187-04-9 TIMA Editions/THERMINIC 2006.*

Nazarian (Thermal Modeling, Analysis, and Management in VLSI Circuits: Principles and Methods, 2006) Procedings of the IEEE, vol. 94, No. 8, Aug. 2006 10.1109/jproc.2006.879797.*

Christiaens, F., A Generic Methodology for Deriving Compact Dynamic Thermal Models, Applied to the PSGA Package, IEEE Transactions on Component Packaging and Manufacturing Technology—Part A. vol. 21. No. 4 Dec. 1998.*

Palenius, T., Roos, J., Comparison of Reduced-Order Interconnect Macromodels for Time-Domain Simulation, IEEE Transactions on Mircowave Theory and Techniques, vol. 52, No. 9, Sep. 2004.*

Kerns, K.J., Yang, A.T., Stable and Efficient Reduction of Large, Multiport RC Networks by Pole Analysis via Congruence Transformations.*

H. Chiueh, J. Draper, L. Luh, and J. Choma Jr., "A thermal evaluation of integrated circuits: On chip offset temperature measurement and modeling," in Proc. 2nd Internationl Workshop on Design of Mixed-Mode Integrated Circuits and Applications, 1998, pp. 109-113.*

Li_2005, Efficient Thermal Simulation for Run-time Temperature Tracking and Management, Proceedings of the 2005 International Conference on Computer Design (ICCD'05).*

Drofenik_2006 Drofenik, U., A Thermal Model of a Forced-Cooled Heat Sink for Transient Temperature Calculations Employing a Circuit Simulator, IEEJ Trans. IA, vol. 126, No. 7, 2006.*

Pramod_2008 Pramod, P.M., Application of Reduced Order Modeling Techniques to Problems in Heat Condution, Isoelectric Focusing and Differential Algebraic Equations, Doctor of Philosophy, 2008 University of Maryland, College Park.*

Rundnyi_2006 Rudnyi, E., Moosmann, C., Greiner, A., Bechtold, T., Korvink, J.: Parameter Preserving Model Reduction for MEMS System-level Simulation and Design. In: Fifth MATHMOD Proceedings 1 (2006).*

Rundnyi_2005 E. B. Rudnyi, J. G. Korvink, Boundary Condition Independent Thermal Model, In: Benner, P.,Golub, G., Mehrmann, V., Sorensen, D. (eds) Dimension Reduction of Large-Scale Systems, Lecture Notes in Computational Science and Engineering (LNCSE). Springer-Verlag, Berlin/Heidelberg, Germany (2005), vol. 45 (ISBN 3-540-24545-6).*

Codescasa_2003 Codescasa, L., An Arnoldi Based Thermal Network Reduction Method for Electro-Thermal Analysis, IEEE Transactions on Components and Packaging Technologies, vol. 26, No. 1, Mar. 2003.*

Celo_2005 Celo, D., The Creation of Compact Thermal Models of Electronic Components Using Model Reduction, IEEE Transactions on Advanced Packaging, vol. 28, No. 2, May 2005.*

Vinke_1997 Vinke, H., Compact Models for Accurate Thermal Characterization of Electronic Parts, IEEE Transactions on Components, Packaging, and Manufacturing Technologies—Part A, vol. 20, No. 4, Dec. 1997.*

Martins_2009, Martin, O., A New Methodology for Early Stage Thermal Analysis of Complex Electronic Systems, EDA Publishing/ Therminic 2009 ISBN: 978-2-35500-010-2.*

Huang, W., HotSpot—A Chip and Package Compact Thermal Modeling Methodology for VLSI Design, Dissertation Doctor of Philosophy, University of Virginia Charlottesville, Virginia, Jan. 2007.*

Yang, Y., Adaptive multi-domain thermal modeling and analysis for integrated circuit synthesis and design, ICCAD 2006, Nov. 5-9, 2006.*

Jessee, J.P., An Adaptive Mesh Refinement Algorithm for Radiative Transport Equation, Journal of Computational Physics 139, 380-390 (1998) Article No. CP975870.*

Howell, L.H., A Conservative Adaptive-Mesh Algorithm for Unsteady, Combined-Mode Heat Transfer Using the Discrete Ordinates Method.*

"Reduced electro-thermal models for integrated circuits." Furmanczyk, M., et al., In: Proceedings of Modelling and Simulation of Actuators; Apr. 8, 1008; pp. 139-144.

"Automatic generation of compact electro-thermal models for semiconductor devices." Bechtold, T., et al., In: IEICE Transactions on Electronics; 2003; pp. 1-22.

(56) References Cited

OTHER PUBLICATIONS

"A generic methodology for deriving compact dynamic thermal models, applied to the PSGA package." Christiaens, F., et al., In: IEEE Transactions on Components, Packaging and Manufacturing Technology: Part A, IEEE Service Center, vol. 21, No. 4; Dec. 1, 1998; pp. 565-576.
"Compact models for accurate thermal characterization of electronic parts." Vinke, H., et al., In: IEEE Transactions on Componenets, Packaging and Manufacturing Technology: Part A, IEEE Service Center; vol. 20, No. 4; Dec. 1, 1997; pp. 411-419.
"3D Chip Stack with Through-Silicon Vias (TSVS): Identifying. Evaluating and Understanding Reliability Interactions", Jedec Publication: JEP158, Jedec Solid State Technology Association, Nov. 2009.
"Descriptive Designation System for Semiconductor-device Packages", Jedec Standard: JED30E, Jedec Solid State Technology Association, Sep. 2008.
"Thermal Test Environment Modifications for Multichip Packages", Jedec Standard: JESDSJ-31, Jedec Solid State Technology Association, Jul. 2008.
"Design Requirements for Outlines of Solid State and Related Products"—Jedec Design Registration—Jedec Publication 95, Design Registration 4.22—Jedec Solid State Technology Association, Mar. 2010.
Jedec Standard: No. 21-C 3.12.1-1.
"RF system in Package Design for Portability Between Suppliers and Technology Platforms", Chris Barratt: Insight SIP, 2010.
"Gerber Format Application Note—Painting considered Harmful" Karel Tavernier, Ucamco, Jun. 17, 2011, © Copyright Ucamco NV, Gent, Belgium.
The Gerber Format Specification: RS-274 X or Extended Gerber, Karel Tavernier, Jan. 2012, Revision H, © Copyright Ucamco NV, Gent, Belgium.
"The Finite Element Method"., Gouri Dhatt, Gilbert Touzot, Emmanuel Lefranyois, editor Paris: Lavoisier: Hermes Science Publ., printed in 2005.
DPF Version 7—Format Description DPF v7-DMS Reference US-DP7X-TB• OI-EN-A, Ucamco Software: Mar. 2009, © Copyright Ucamco NV, Gent, Belgium.
"Improving CAD to CAM Data Transfer: A Practical Approach", Karel Tavernier, Ucamco, Journal ofHKPCA, Issue N ° 40/2011/Q2.
AutoCAD 2012: DXF Reference—Autodesk—Feb. 2011, © Copyright 2011 Autodesk, Inc.
"Initial Graphics Exchange Specification—IGES 5.3" Formerly ANS US PRO/IP0-1 00-1997.
Ship STEP on a Page, ISO 10303: Standard for the Exchange of Product model data (STEP), Nov. 1, 2006.
STEP Application Handbook ISO 10303 Version 3—SCRA, Jun. 30, 2006.
ISO I 0303—STEP—A key standard for the global market, ISO Bulletin Jan. 2002 and Apr. 2002.
ISO TC 184/SC4, STEP on a Page.
"Finite Element Simulation of Heat Transfer", Jean-Michel Bergheau et al., Hermes Science Publications, Jan. 10, 2004.
"Introduction to Scientific Computing", Brigitte Lucquin and Olivier Pironneau, Masson, 1996.
"Stable and Efficient Reduction of Large, Multipart RC Networks by Pole Analysis via Congruence Transformations", Kevin J. Kems and Andrew T. Yang, Proceeding DAC-ACM, 1996.
"Software solving the large sparse symmetric generalized eigenproblem". Jones, Mark T. And Patrick, Merrell L., Institute for Computer Applications in Science and Engineering, NASA Langley Research Center, Hampton, VA.
"The Lanczos algorithm with selective orthogonalization", Parlett B.N. and Scott D.S. (1979):—Math. Comp., vol. 33, No. 145, pp. 217-238.
"A Parallel Block Lanczos Algorithm and its Implementation for the Evaluation of some eigenvalues of large sparse symmetric matrices on multicomputers". Mario Rosario Guarrcino et al., Int. J. Appl. Math. Comput. Sci., 2006, vol. 16, No. 2, 241-249.
"A parallel Lanczos method for symmetric generalized eigenvalue problems", K. Wu et al., Technical Report LBNL-41284, National Energy Research Scientific Computing Division, Lawrence Berkeley National Laboratory, Berkeley, CA, 1997.
International Search Report dated Jun. 1, 2010 for PCT/ EP2010/ 055301.
International Search report dated Nov. 4, 2009 for FR 0952693.

* cited by examiner

FIG. 7C

METHOD AND DEVICE FOR THE DESIGN OF THERMAL MODELS FOR ELECTRONIC SYSTEMS

TECHNICAL FIELD AND PRIOR ART

The invention relates to a method and a device for both improving performances and accuracy of analyses of thermal phenomena of electric components and this, by minimizing the intervention of the engineer. The significance of the rise in temperature and of the Joule losses for electronic systems ranging from the smaller and complex systems (transistor, interconnection, silicon, casing . . . ) up to the larger systems (printed circuit) increases with progress of the technologies and the loss of performances on autonomy, speed and placement.

In order to take into account the whole set of thermal models, the invention notably proposes a base of unified models in the form of parametrizable, compact numerical models which may be modulated.

The base is then exploited by numerical simulation of multi-source linear systems. A goal is to allow prediction of induced thermal phenomena as early as possible in the manufacturing line of the circuits.

The building of thermal models requires the skills of the thermodynamics engineer and the skills of the electronic engineer.

Further, these models are demanding in terms of useful memory and in computation time. This is why it is strongly recommended to accumulate this knowledge and to simplify it while reducing the time for building a model.

The model is a set of data ranging from manufacturing drawings, geometry, materials, up to the design of the circuit. The model contains all the information for simulating the thermal behavior, illustrated as a network of connections which are complex numbers also called tensors.

This network is of large size; the limits imposed by the computer like memory, speed and accuracy, do not allow simulation of the complete assembly of an electronic system.

A complete electronic system comprises: the printed circuit ("board"), the interconnection tracks and the electronic components. A component itself consists of sub-elements such as the silicon ("die"), the substrate of the casing ("package substrate"), the wires ("wire bonds"), the tabs ("pins, balls"), of the sources and the casing.

As technologies progress, the elements are often combined into a single electronic component, such as for example for the SiP, PoP, "Stack-MCP", DS-MCP, "Plane-MCP" and "3D Package Module" technologies described by the JEDEC standards (http://www.jedec.org). The multitude of pieces of information to be handled and the expected flexibility for the building of models makes complete automation of the engineer's tasks unavoidable.

Various other problems are associated with the latter.

A first problem is the construction of a model from data stemming from files, for example these data stem from manufacturing drawings for electronic components and the output is a set of detailed models.

Another problem is the construction of compact or reduced thermal models, in order to improve both simulation and storage performances. The main constraint thereof is the unavailability of reference simulations. The techniques for identifying compact models from combinations of time or frequency simulations cannot be contemplated for multi-level modeling given that the detailed models are too voluminous. It is therefore sought to directly pass from a local numerical model of a component of the system to the rapid simulation thereof in any other complete system environment.

State of the art methods are disclosed in the following articles:

Furmanczyk et al.: "Reduced Electro-Thermal Models for Integrated Circuits", Proceedings on modeling and simulation of Microsystems, semiconductors, sensors and actuators, 1998, p. 139-144;

Filip Christiasns et al. "A Generic Methodology for Deriving Compact Dynamic Thermal Models, Applied to the PSGA Package" IEEE transactions on components, packaging and manufacturing technology, Part A, vol. 21 (4), 1998;

H. Vinke et al. "Compact Models for Accurate Thermal Characterization of Electronic Parts", IEEE transactions on components, packaging and manufacturing technology, Part A, vol. 20 (4), 1997.

In all these articles, one builds first a complete numerical model of the system, and one then makes many simulation combinations to then approximate an equivalent compact model from measurement signals.

Moreover, thermal modeling teams each have a very specific field (one for the silicon, the other for the casing and so forth for all the portions). They therefore use numerical modeling tools adapted to each problem, which do not necessarily have the same representation of the data for operating or else for describing the resulting numerical model. Another technical problem is therefore uniformization of the representation of the models for facilitating their sharing between teams.

Further, another problem is the construction of models from other models available in the base. For example, a casing model should be able to be "connected" to a silicon model; itself connected to the printed circuit. The question is the connection of the models.

Finally, in order to utilize at best the performances of the base, another problem is the parametrized modification of all the exchange relationships of the model with the outside world (heat transfers) as well as the non-linear variation of the model versus temperature (resistivity varies with temperature).

Generally, the problem is posed of obtaining greater flexibility in the interactive simulation of the phenomena related to the temperature of electronic components.

PRESENTATION OF THE INVENTION

The invention first relates to a method for simulating an electronic circuit, in order to simulate its thermal properties, including:

a) the breaking down of the circuit into components, each component being represented as a first model, a so-called detailed model, including at least one meshing of the component, a matrix of heat conductances and a matrix of heat susceptances, b) the definition of at least one interface area of each model, c) the formation of a reduced model of each model including reduction of the heat conductance matrix and of the matrix of heat susceptances (or capacitances, both terms are indifferently used in the subsequent text).

The invention also relates to a method for simulating the thermal behavior of an electronic circuit, including:

a) the breaking down of the circuit into components, each component being represented as a first model, a so-called detailed model, including at least one meshing of the component, one matrix of heat conductances and one matrix of heat capacitances, b) the definition of at least one interface area of each model, c) the formation of a reduced model of each model including reduction of the heat conductance matrix and of the matrix of heat capacitances, d) the connection of the reduced models of the different components in order to form a reduced model of the circuit, e) the simulation of the thermal behavior of the circuit by means of this reduced model of the circuit.

In the case of an unsatisfactory result of the simulation, the position of at least one component in the circuit may be modified. There is then formation of a second reduced model and simulation of the thermal behavior of the circuit with this new reduced model.

In the case of a satisfactory result of the simulation, it is possible to proceed with manufacturing the circuit. The invention therefore also relates to a method for manufacturing a circuit including the above steps.

In a method according to the invention, one does not need a complete numerical model of the system nor any measurement.

The detailed model of each component (step a) is independent of the boundary conditions, i.e. valid regardless of the simulation environment.

Step c) is carried out without any reference to a detailed model. Further, the reduced model is independent of the boundary conditions so as to be used in any simulation environment.

In such a method according to the invention, an operator is only involved at the input of the chain by collecting data describing the electronic system to be modeled as well as the geometrical files; he/she is involved at the end for controlling and viewing the analyses. Therefore this is an entirely automatic system.

With a method according to the invention it is possible to rapidly model the thermal behavior of a component or of a circuit:
  its static or stationary (not varying over time) behavior on the one hand;
  its dynamic behavior (varying over time) on the other hand.

With a method according to the invention, from an input as power or heat sources applied in various points of a circuit (simultaneously), it is possible to see how the circuit behaves from a thermal point of view both from a static point of view and from a dynamic point of view. A method and a device according to the invention are therefore multisource.

A method according to the invention is further independent of the boundary limits (it is of the "BCI" type that is "Boundary Condition Independent"). The simulation environment is not taken into account in the modeling method. The model only depends on the own or intrinsic parameters of the materials of which the circuit is made. By simulation environment one understands the additional elements one uses to simulate the model. For example a connection with a board, and/or heat transfer to the ambient air, and/or applied power sources, and/or measurement surfaces. In other words it includes everything which enables or allows measuring heat increase of a surface or a device or a circuit when considering heat transfers and outside elements.

A detailed model of a component or of a circuit results from applying a method for extracting the physical behavior of the material(s). The mathematical representation is a system of equations of very large size.

The size of such a model is reduced in order to obtain a compact model (or micromodel). Simulations of the detailed model can neither be contemplated nor used for obtaining the compact model.

Compact models may be assembled or formed.

A component or a circuit may include several portions, each in a material different from that of another portion. Each of these portions may be modeled by a method according to the invention, the whole of these portions being assembled or combined by a method according to the invention.

A model is a simplified representation of a circuit or of a component and of its physical behavior. Such a model has points or areas, so-called input or output interface areas, which allow connection to other models and/or interaction with the environment, by heat transfers.

A component or a circuit may be represented by its geometrical outlines, and by more or less fine meshing.

The formation of a reduced model may apply a projection in a reduced base.

Uniform formation of models is achieved whether this is a solid model, or a model of surface sources, or a model of surface measurement(s) or a convective and/or radiative model (heat radiation).

With the invention, a reduced model may be formed with frequency-controlled accuracy.

It preserves the direct transfer functions of the first order as well as the passivity (no amplification) and the stability of the numerical system (eigenvalues, all of the same sign).

Preferably, the reduction of the heat conductance matrix and of the matrix of heat capacitances includes a reduction of the part of each of these matrices which connects internal nodes of the meshing.

With the formation of a reduced model, it is possible to obtain a reduction level of more than 80% or 90%.

A method according to the invention may include a preliminary step for simplifying the geometrical description of at least one component.

In a method according to the invention, the size of the mesh may be defined depending on the transfer frequency of a heat flow in an elementary volume of the component.

Meshing may be determined by applying a method such as the finite element method FEM, or the finite difference method FDM or the boundary element method BEM or the finite volume method FVM.

Preferably, the model used takes into account thermal exchanges with the outside atmosphere by means of a specific interface H.

A method according to the invention allows determination or modeling of various parameters related to the thermal behavior of the component, for example the delay which occurs in the propagation of a signal in the circuit, depending on the temperature of the latter, and/or on the power consumed in the circuit and/or on a temperature measured at one point of this circuit, depending on time and/or on one or more voltage drops at the terminals of the circuits and/or on the heat resistance of the latter, and/or any other parameter which depends on temperature in the circuit.

A step for physically modifying a circuit or a component may be applied before or after application of a method according to the invention, and before the manufacturing of such a circuit or component.

The invention also relates to a device for simulating the thermal behavior of an electronic circuit, including:

a) means for breaking down a representation of a circuit into components, each component being represented as a first model, a so-called detailed model, including at least one meshing of the component, one matrix of heat conductances and one matrix of heat capacitances, b) means for defining at least one interface area of each model, c) means for forming a reduced model of each model including the reduction of the heat conductance matrix and of the matrix of heat capacitances, d) means for connecting reduced models of the different components, in order to form a reduced model of the circuit, e) means for simulating the thermal behavior of the circuit by means of this reduced model of the circuit, f) means for, in the case of an unsatisfactory result of the simulation, modifying the position of at least one component in the circuit, forming a second reduced model, and simulating the thermal behavior of the circuit with this new reduced model.

The invention also relates to a device for simulating the thermal behavior of an electronic circuit, including a computer device (or a microcomputer device or a programmable processor) programmed or adapted:

a) for breaking down a representation of a circuit into components, each component being represented as a first model, a so-called detailed model, including at least one meshing of the component, one matrix of heat conductances and one matrix of heat capacitances, b) for defining at least one interface area of each model, c) for forming a reduced model of each model including the reduction of the heat conductance matrix and of the matrix of heat capacitances, d) for connecting reduced models of the different components, in order to form a reduced model of the circuit, e) for simulating the thermal behavior of the circuit by means of this reduced model of the circuit, f) for, in the case of an unsatisfactory result of the simulation, modifying the position of at least one component in the circuit, forming a second reduced model, and simulating the thermal behavior of the circuit with this new reduced model.

A device according to the invention may be incorporated into a circuit manufacturing assembly. The invention therefore also relates to a system or a device for manufacturing circuits including a device such as the device above and means for, in the case of a satisfactory result of the simulation, manufacturing of the circuit.

Preferably the means c) include means for:

applying a projection in a reduced base, and/or controlling accuracy with a single parameter, the observation frequency of thermal phenomena, and/or carrying out a reduction of the part of each of these matrices which connects internal nodes of the meshing, and/or obtaining a reduction level of more than 80% or 90%.

A device according to the invention may further include means for performing a preliminary step for simplifying the geometrical description of at least one component.

The size of the meshing may be defined depending on the transfer frequency of heat flow in an elementary volume of the component.

The invention also relates to a computer readable medium for simulating the thermal behavior of an electronic circuit, said medium including data or program instructions to implement a method according to the invention as disclosed above when said medium is loaded on a computer or a microcomputer.

SHORT DESCRIPTION OF THE DRAWINGS

FIG. 1 illustrates manufacturing of an integrated circuit, including thermal analysis steps according to the invention, FIGS. 2A-2D illustrate a component subject to a thermal simulation method on the one hand, representations of physical parameters which result from this behavior on the other hand, FIG. 3 illustrates a meshing model for a silicon block, with two power sources and three temperature measurement points, FIG. 4 illustrates an exemplary component equivalent to a composition of micromodules, FIGS. 5A and 5B illustrate a matrix which may be used in a method according to the invention, FIG. 6 illustrates a detailed model and its interface F, FIGS. 7A-7C illustrate aspects of the assembly of two micromodules, FIG. 8 illustrates a model and a thermal dissipation interface, FIG. 9 illustrates a power injection and measurement interface on a detailed model, FIG. 10 illustrates steps of a method according to the invention, FIG. 11 illustrates a simplified integrated circuit as seen from above, FIGS. 12-14 illustrate results of a simulation on a complete circuit, FIGS. 15A and 15B schematically illustrate a device for applying a method according to the invention, FIGS. 16-19 illustrate geometrical simplification steps which may be applied within the scope of a method according to the invention, FIG. 20 illustrates the organization of a database resulting from a method according to the invention, FIG. 21 illustrates an exemplary method for utilizing a database resulting from a method according to the invention, FIGS. 22 and 23 illustrate geometrical simplification steps which may be applied in a method according to the invention.

DETAILED DISCUSSION OF PARTICULAR EMBODIMENTS

A thermal analysis method according to the invention may be applied in a chain for designing an integrated circuit.

An example of such a chain is illustrated in FIG. 1 and first includes (step S1) an analysis of the functionalities, and then a study of the architecture (step S2). During this step, the positioning of the different components of the circuit is determined.

During a step S3, a thermal analysis step or method according to the invention is applied. In other words, this analysis occurs during the elaboration of the electronic structure. Thermal phenomena are then considered, and their possible influence on other parameters such as the delays generated in the circuit and/or the consumed power versus time. With the results, it is possible to make one or more selections on the architecture and technology to be used. If the result of this step is not satisfactory, the architecture of the circuit and/or the selection of certain materials may be changed. The result may be unsatisfactory here in particular, there exist thermal congestion points.

At this stage, it is sought to perform a rapid (within a few minutes) analysis, simple to carry out, even for an engineer not specialized in thermodynamics.

Depending on the significance of the perturbing phenomena, it is possible to return to the technological selections and to the architecture made in S2. This is then followed for example by one or more design steps, here a step S4 for functional design, and then a step S5 for electronic design. These steps only apply to the architecture which has been determined beforehand.

Next, a step S6 may be performed for physical verification (these are the last verifications before starting the manufacturing process): the operation of the model of the circuit is tested, notably from the electromagnetic point of view, for example as described in document WO2007/051838.

This step may include or be followed by, a verification of the thermal analysis performed earlier (step S7), which may be combined with electric analyses (because temperature changes electric resistance).

Possibly, the architecture may be changed or redone while taking into account the physical verification.

In the case of a satisfactory result of this step S7, the circuit may be manufactured (step S8). In the case of an unsatisfactory result, certain steps may be carried out again such as in S4 and/or S5 and/or S6 and/or S7.

Figure 2A:
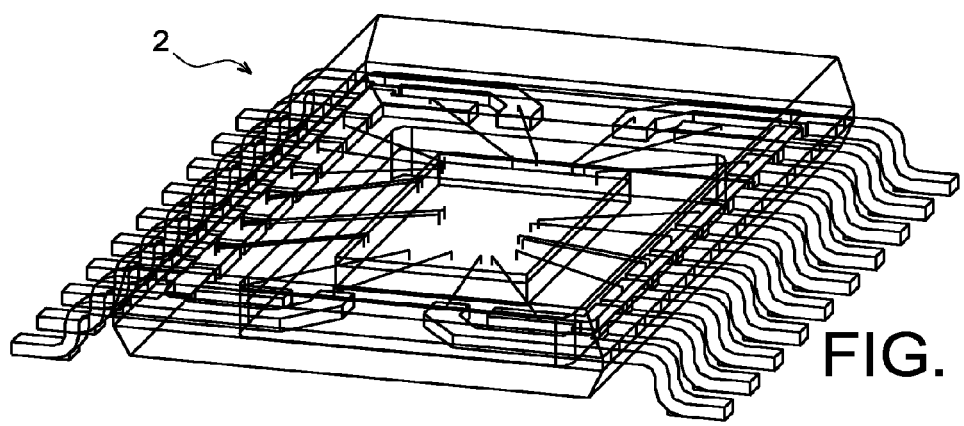
FIG. 2A illustrates a circuit 2, for which an analysis of thermal phenomena which occur when the circuit is operating, is performed by means of a method according to the invention. It is this type of analysis which is carried out during steps S3 and S7 already described above.
Figure 2B:
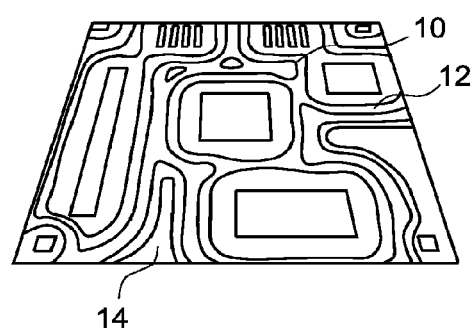
FIG. 2B illustrates a diagram of the activity of the circuit 2, with areas 10, 12, 14 which may be of different colors depending on the attained temperature.
Figure 2C:
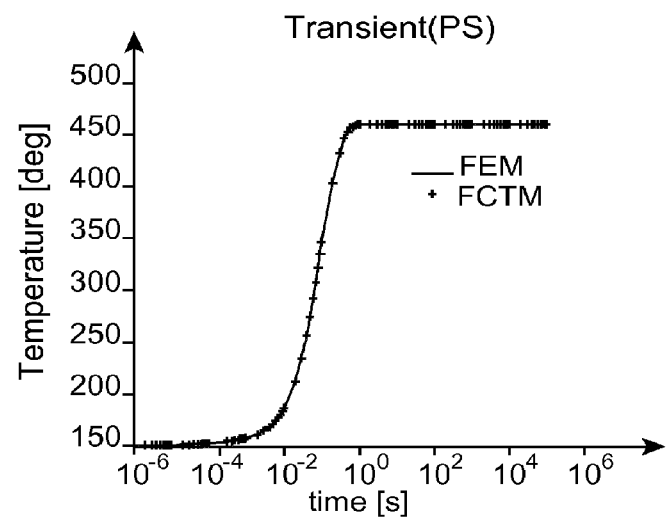

Another possible representation is that of FIG. 2C, which represents the delay which occurs in the propagation of a signal in the circuit, depending on the average temperature on a surface portion of the latter.

Finally, the power consumed in the circuit and/or a temperature measured in one point of this circuit (see FIG. 2D), may be illustrated versus time.

Moreover, with a method according to the invention, it is possible to calculate one or more voltage drops at the terminals of the circuit 2 and/or the heat resistance of the latter, and/or any other parameter which depends on temperature in the circuit.

Figure 15A:
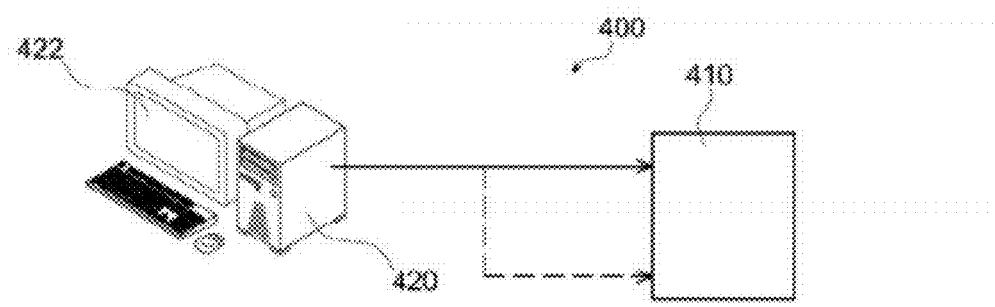

With a method according to the invention, it is possible to achieve various graphic illustrations on a viewing screen, such as the screen 422 of FIG. 15A, for example an illustration of the data of FIGS. 2A-2D.

In a method according to the invention, any element, for example a portion of an electronic system, or a component or a material, is associated with a representation of the physical behavior of this element, in order to analyze the heat transfers which occur therein while it operates.

A meshing of this element is determined by applying a method such as the finite element method FEM (a technique for example described by Jean-Michel Bergheau in the textbook <<Simulation Numérique Des Transferts Thermiques Par Eléments Finis>>, Hermes Science Publications, 01.10.2004, or by a finite difference method FDM (as described for example in the textbook "Méthode des éléments finis, Gouri Dhatt, Gilbert Touzot, Emmanuel Lefrançois, editor Paris: Lavoisier: Hermès Science Publ., printed in 2005" or Brigitte Lucquin and Olivier Pironneau, "Introduction to Scientific Computing, Masson 1996"), or by a boundary element method BEM, or by a finite volume method FVM.

The result of the meshing may be stored in memory, for example stored in a database.

A mathematical method is extracted from the meshing of the relevant volume.

A meshing of an electronic component volume contains external points and internal points. In each of the external points, a power source may be applied or a temperature may be measured, which is not possible in an internal point of the meshing. But there may be a heat transfer between two arbitrary points i,j of this meshing, whether these points are internal or external.

Figure 3:
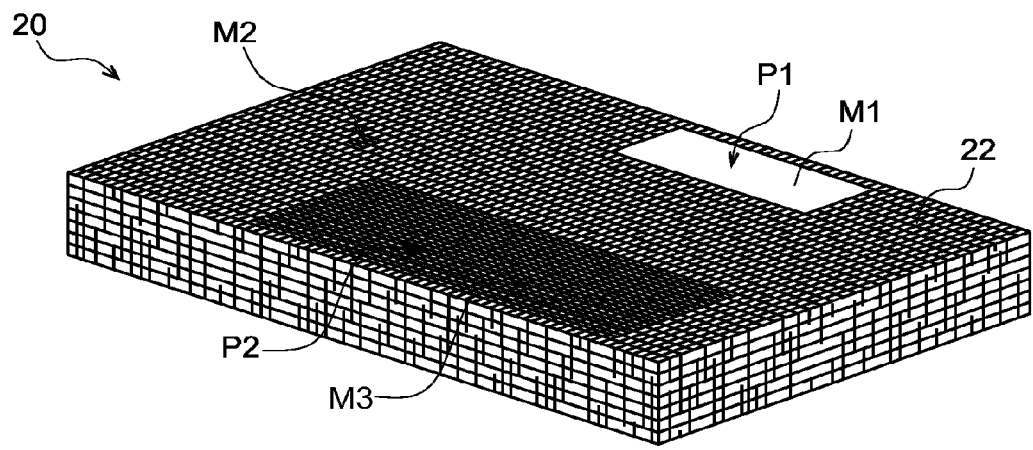

For example, an exemplary model of meshes is illustrated in FIG. 3 for a silicon block 20. Two points of application of two power sources $P_1$ and $P_2$ applied on two portions of the upper surface 22 of this block, and three measurement points $M_1$, $M_2$, $M_3$ also on three portions of this surface 22 are illustrated. This is a so-called multi-source model.

Generally, regardless of the relevant element, a thermal model of this element includes a linear system connecting inputs (input points) of this element, which are points where power sources are applied, to outputs (output points) which are points of this element where the temperature is measured. With this system, it is possible to determine the heat transfers between two arbitrary points i,j of the meshing associated with this element.

More particularly, quantities may be used which represent this thermal behavior between two arbitrary points, such as heat resistance, heat conductance or impedance, or further heat capacitance.

The heat resistance characterizes the temperature rise in a point i of the meshing relatively to its neighbor j for a given exchange power $\phi$:

$$r_{ij} = \frac{T_i - T_j}{\phi}$$

wherein:

r is the heat resistance ($K \cdot W^{-1}$), $T_i$ and $T_j$ respectively are the temperatures at point i and at point j, in Kelvins, $\phi$ is the exchange power (W)

The heat conductance $g_{ij}=1/r_{ij}$ between two meshing nodes i and j expresses the conductivity for letting through heat flow and is expressed in Watts per Kelvin ($W \cdot K^{-1}$).

The heat capacitance (or susceptance) $jc_{ij}$ between two meshing nodes i and j is a pure imaginary number which expresses the time-dependent change of the heat flow in a volume defined by the meshing:

$$c_{ij} = \frac{\phi}{\frac{d(T_i - T_j)}{dt}}$$

wherein c is the heat capacitance (in $J \cdot m^{-3} \cdot K^{-1}$), and t is time.

The heat admittance $y_{ij}$ between two meshing nodes i and j associates the conductance and capacitance such that $y_{ij}=g_{ij}+j\omega c_{ij}$ for $\omega=2\pi f$, with f being the power flow change frequency.

Several thermal models of elements may be combined in order to provide a thermal model of a more complex assembly than that of each of the separate elements. In the following, the abbreviated expression <<model>> is used instead of <<thermal model>>.

Each model of an element may incorporate one or more interfaces F with view to connection with another element.

Figures 7A, 7B:
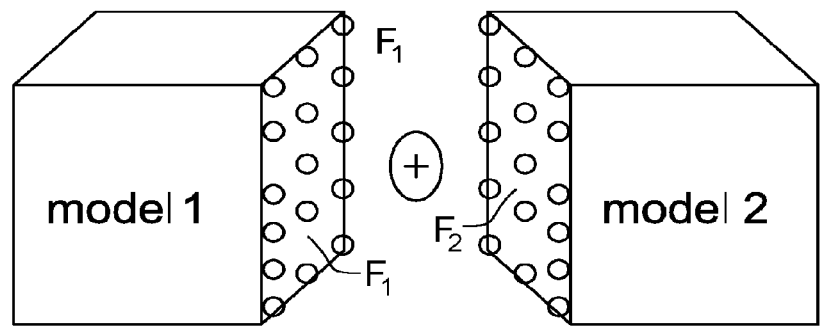

Indeed, each element is not intended to remain isolated but may potentially be part of a vaster assembly which includes other elements with which it will be in contact. Thus, for example, an integrated circuit, such as the one illustrated in FIG. 11, includes connection pins 32, 32' of the circuit 30. The actual integrated circuit 30 may form a first element, the whole of the connection pins 32, 32', a second element, both of these elements being in contact with each other. If, during operation, the circuit releases a certain amount of heat, part of this heat will be diffused towards the set 32, 32' of pins. The model of the circuit 30 may include an interface intended to be put into contact, in this example, with an interface of the model of the set 32, 32' of pins. FIG. 7A illustrates the assembly of two arbitrary models via their respective interfaces F1 and F2.

Further, each model of an element may incorporate an interface H which represents the heat exchanges with the outside atmosphere. This interface does not correspond to a particular physical area of the element but allows modeling of these heat exchanges which most often occur through several surfaces or several areas of the elements.

Figure 4:
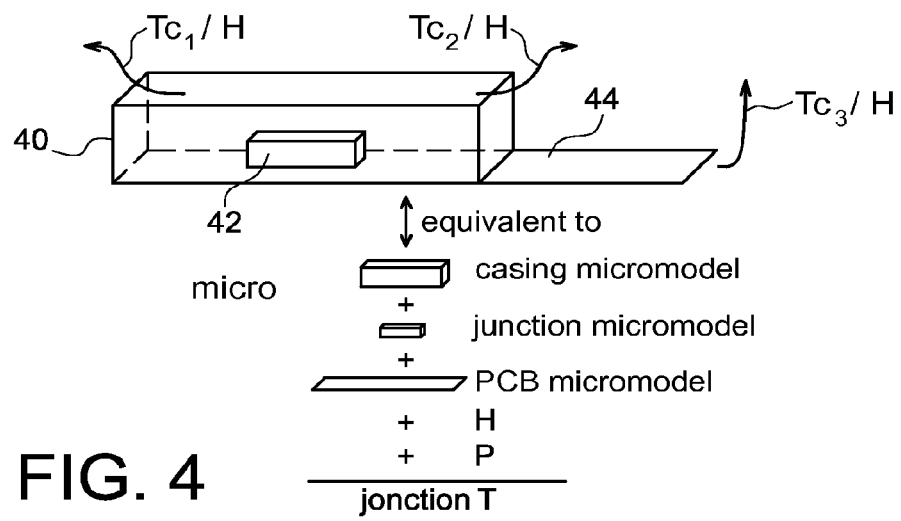

FIG. 4 is an example of a component including 3 elements, a casing 40, a junction 42 and a PCB substrate 44. The casing 40 and the junction 42 are in contact with the substrate 44. There are heat transfers from the casing 40 towards the junction 42 and towards the substrate 44, from the junction 42 towards the substrate 44, and from each of these elements 40, 42, 44 towards the outside atmosphere. Each of these elements is moreover modeled individually as explained above.

The transfers between the various elements 40, 42, 44 occur through the interfaces F, whereas the transfers from these different elements towards the outside atmosphere (illustrated in FIG. 4 by the arrows Tc1, Tc2, Tc3) are modeled by the interfaces H. In this same figure, the arrow P illustrates a supply of power to the junction on a surface portion.

This system of FIG. 4, results from the combination of a model of the casing 40, of a model of the junction 42, of a model of the substrate 44, of the heat exchange interfaces H with the surrounding medium, and of power P injection areas or points. In this case, the temperatures are measured on a surface of silicon, for example the <<TOP>> surface of the silicon. A few points uniformly distributed over this surface are selected and a 2D interpolation of the temperature measurements is displayed.

In other words, generally, the models of different elements may be connected together in order to model a more complex system:
- for example an integrated circuit, including its environment,
- or, according to still a further example, an electronic circuit with a printed circuit.

The description of a component which is available may sometimes be very detailed. It may include data or electric diagrams, and/or data or mechanical diagrams, and/or data of characteristics of the materials and/or data or indications of electric and/or thermal simulations. They may be written into files with various formats, for example one of the GERBER formats ([GERBER] Gerber Format, "Plot Data Format Reference Book", 1993 by Gerber Systems Corporation), or DXF formats ([DXF] Autocad DXF, Autodesk documentation) or IGES/STEP formats (ANSI 1996, US Product Data Association (USPRO)). These are formats which are generated by the manufacturers of electronic components for automation of machine tools.

A same file may therefore be used for the manufacturing of a component on the one hand, for the thermal modeling according to the invention on the other hand.

However, for thermal modeling, it is unnecessary to keep all the details of the input file. An attempt may therefore be made to simplify at least the geometrical data. For this, each geometrical portion is replaced by its rectangular parallelepipedic envelope, preferably the closest in volume, which contains this portion.

Further the geometrical description of a component portion may be in a single portion or in different characteristic sub-portions (or entities).

Figure 16:
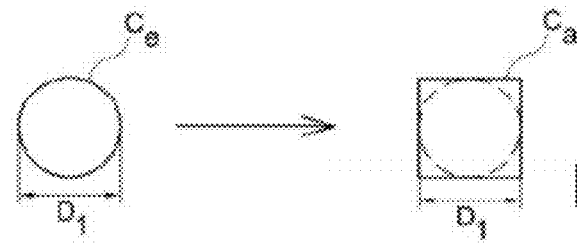
Figure 17:
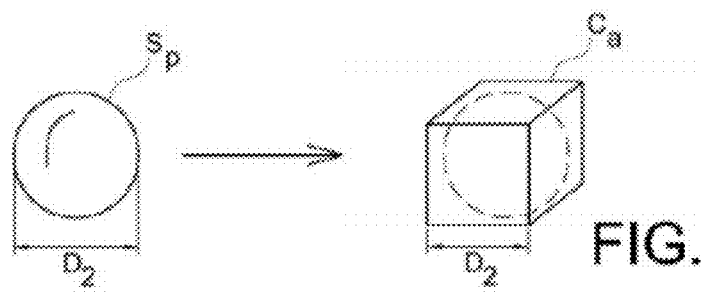
Figure 18:
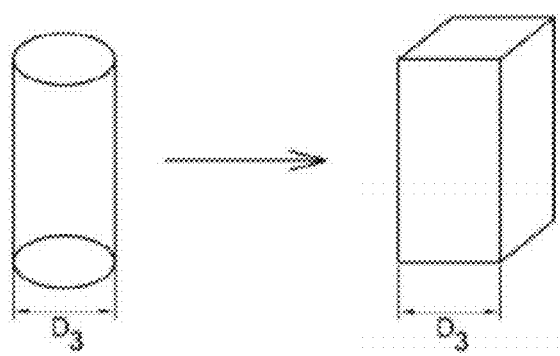
Figure 19:
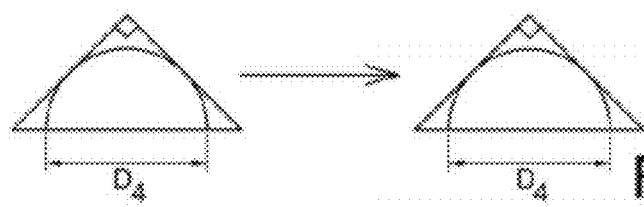

In order to still further simplify modeling, the geometrical entities which include rounded shapes may be changed in the following way:
- a circle of diameter D1 becomes a square of side D1 (FIG. 16),
- a sphere of diameter D2 becomes a cube of diameter D2 (FIG. 17),
- a cylinder, the base of which is a circle of diameter D3, becomes a hollow rectangular parallelepiped, the base of which is a square of side D3 (FIG. 18),
- a circular portion of diameter D4 becomes a right angle tangent to this circular portion (FIG. 19).

An entity is a geometrical term; there are moreover edges and points which delimit shapes which are not entities. For the latter, and for uniformizing the processing, the description of each characteristic portion is transformed into edges and into vertices, regardless of the geometrical shape of this portion.

The volume of a component is mainly delimited by quadrilaterals, most forming parallelepipeds. These quadrilaterals include edges which are essentially perpendicular to each other. But for the rounded shapes, oblique edges may be used for the rounded portions and angle breakages, but also for the cylinders, spheres and holes (only the entities were transformed into parallelepipedal volumes). For example, a quarter-circle will be represented by a series of oblique segments. After transformations of these shapes, the oblique edges may be simplified.

Figure 22:
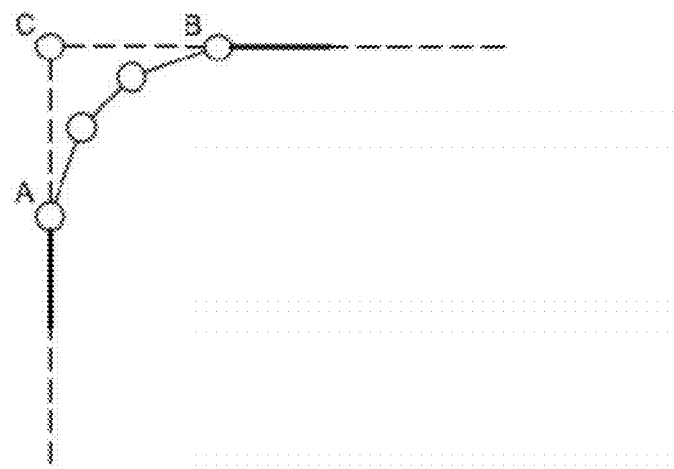
Figure 23:
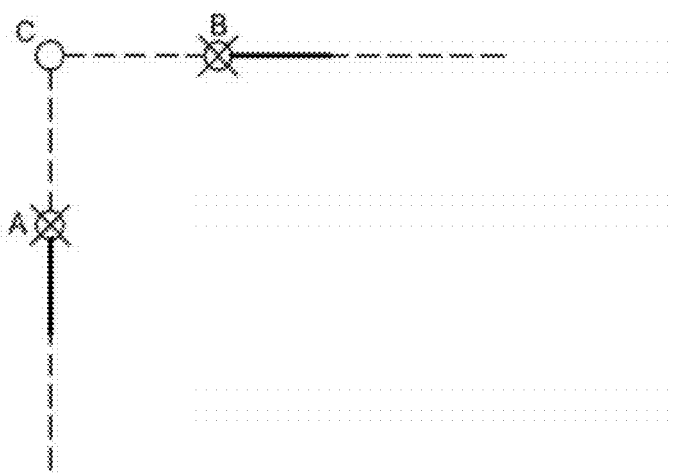

A method for parallelepipedal simplification of geometrical shapes is the following and is illustrated in FIGS. 22 and 23 wherein the points are points of a geometrical shape of a component:
- the apices A, B located at the ends of the edges joined by a series of oblique edges are retained. These ends form pairs of apices (A,B). The oblique edges which join these pairs of apices are retained;
- the oblique edges between the pairs of apices above are suppressed;
- the pairs of apices above are connected, between which the oblique edges are suppressed, through two segments forming a right angle (in C in FIGS. 22 and 23).

The points which are practically coincident (to within $\epsilon$; $\epsilon$ being a parameter which may vary depending on the intended geometrical simplification level) may be merged. It is also possible to merge the close and co-linear edges (to within $\epsilon$; $\epsilon$ being a parameter which may vary depending on the intended geometrical simplification level).

At this stage, the geometry only includes lines perpendicular to each other. However elements consisting of a same material may further be simplified.

Figure 11:
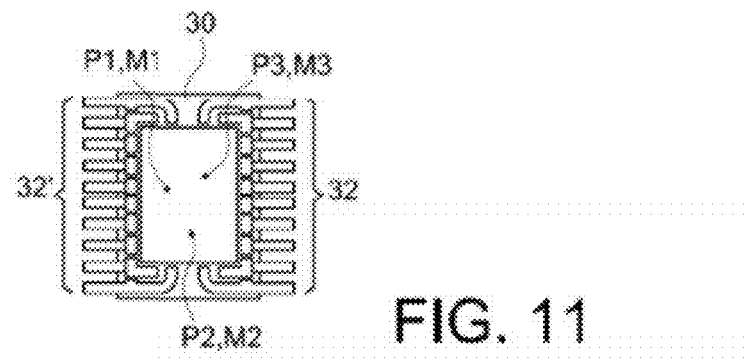

Thus, for example, the soldering pins of integrated circuits are sometimes very close to each other. The union of the edges and of the apices of these elements, form a single parallelepipedal volume. This is what is seen in FIG. 11, which has already been partly described above. In this case, the pins 32 may be grouped together into a single and same element, the same also applies to the pins 32'.

Again, for example, the printed circuit may include several layers, each layer consisting of a single material, the thicknesses of the different layers being different from each other. Each thin layer may then be modeled as a plane, assigned with a parameter which is the thickness of said layer.

The edges and apices are then grouped per material. But, there exist cases where portions have the same material. For this, the identifiers of the material will have been duplicated beforehand (the identifiers point to the same material), will have been associated separately with each portion, therefore with groups of distinct apices and edges. The edges and apices are grouped per material index or per duplicated material index in the case when the volumes are distinct for a same material.

The edges and apices may be grouped per identifier of the material and of the thickness parameter. It is not only the material which determines the group but also the thickness. There are materials which are similar but with different thicknesses. The edges and apices which define distinct volumes are then grouped.

Therefore, a method according to the invention may advantageously apply a step for geometrical simplification or for simplification of initial data relating to the components or to the circuits. Other steps or aspects of this simplification are explained later on.

From the envelope of the thereby simplified volume, it is possible to build a meshing as already indicated above.

As this has already been indicated above, a thermal model of an element includes a linear system connecting inputs of this element, to outputs, and which allows determination of the heat transfers between any two points i, j of the meshing associated with this element.

With such a linear system, a heat transfer matrix is associated. But, as this has been seen, heat transfer phenomena are complex, and it is preferable to take into account heat transfer aspects under steady-state conditions on the one hand, but also dynamic aspects, i.e. the time-dependent change of the distribution of heat flows and of temperatures in the studied component or circuit.

Therefore, a matrix G of heat conductances on the one hand and a matrix C of heat capacitances (or susceptances) on the other hand are associated to a model of a component or of a circuit.

Figure 5B:
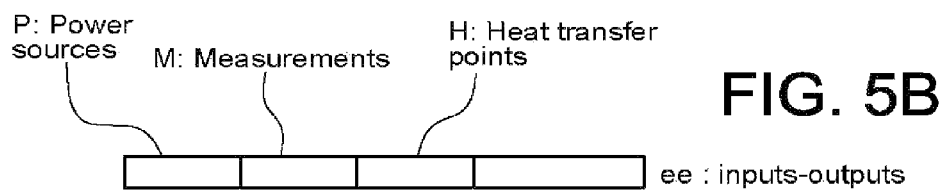
Figure 5A:
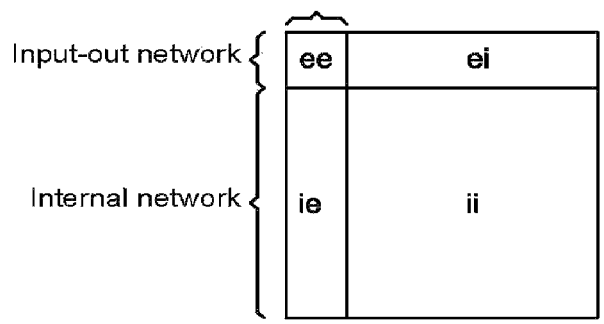

FIGS. 5A-5B schematize the organization of a matrix used in a method according to the invention. This matrix contains data with which the thermal behavior of an element may be defined. The intersection of any line i and of any column j of this matrix indicates the relationship between a point i of the meshing of this element and a point j of this same meshing.

In FIG. 5A, this matrix is divided into four sub-matrices, ee, ie, ei and ii.

The first sub-matrix (ee) relates to direct connections between the inputs and the outputs of the relevant element. This sub-matrix is of size $n_e \times n_e$.

A second sub-matrix (ii) contains the internal connections (between internal elements of the meshing) to which no connection of a power source or on which no temperature measurement is possible. It is of size $n_i \times n_i$. <<ne>> is very small in front of $n_i$, i.e. $n_i \gg n_e^2$.

Preferably, the ratio between $n_i$ and $n_e^2$ depends on the computation capacity of the applied computing machine. On the one hand, the size of a meshing (therefore the number of nodes) is compatible with physics, but additionally the number of retained nodes (or external nodes) is very small in front of the number of internal nodes to be suppressed.

For example: $n_i > 10 n_e^2$ may be a satisfactory compromise. But with a higher coefficient, a better result on accuracy is further obtained, but also on the reduction level (since the method for suppressing internal nodes has a statistical aspect and operates all the better since the number of retained discriminants depends on the fineness of the meshing).

Next, it is sought, as explained later on, to reduce this portion ii of the matrix.

The third and fourth sub-matrices, ie and ei, represent transverse connections between the inputs or the outputs (ee network) and the internal elements (network ii). The sub-matrix ie is of size $n_i \times n_e$, the sub-matrix ei is of size $n_e \times n_i$.

FIG. 5B represents a row of the sub-matrix ee. This row is organized so as to show in this order:
  the meshing points to which are applied the power sources P,
  the meshing points where average temperature measurements M are conducted,
  the points H of heat transfer with the environment (or the meshing surface points to which other models of transfer towards the environment will be connected),
  the points S1, S2, ... Sn ... of the meshing which form one or more connection interfaces F with the other models; preferably the points of an interface are arranged in this order followed by those of another interface. By defining an order, it is possible to find one's way in the method for identifying the interfaces and groups of meshing nodes. Thus, it is possible to describe in the hierarchy of the connections of the model, those which are the interface pairs to be connected with each other, and where they are located in the respective matrices.

This presentation of a matrix relates to both heat conductance matrices and capacitance matrices.

Figure 6:
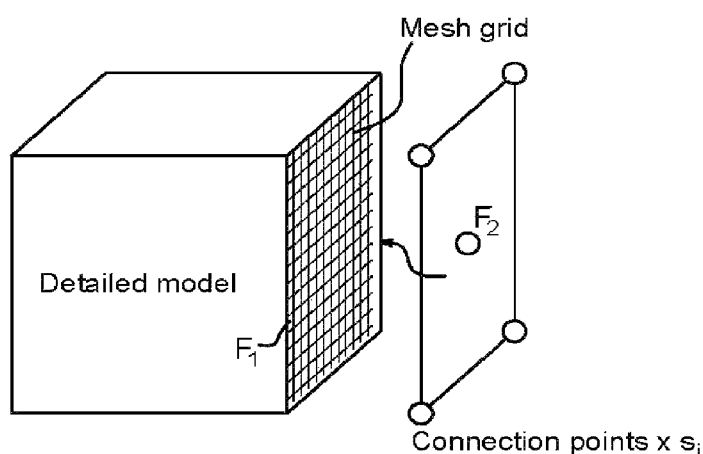

As illustrated in FIG. 6, a connection interface F includes a number of interface nodes Sj. This number is reduced relatively to the initial number of nodes or meshing points which this face includes. In other words, a certain number of connection points $s_j$ are selected in order to form an interface of the model in a face of this detailed model, which gives the possibility of working with much less points than the complete network of points of this face.

A first model of a first element and a second model of a second element may be connected to each other through two respective connection interfaces F1 and F2.

As this has already been explained above, FIG. 7A illustrates the assembly of two arbitrary models through the interfaces F1 and F2.

The heat conductivity matrices G1 and G2 in each of both of these models have been illustrated in FIG. 7B.

Each of these matrices is organized in a way which has been explained above.

Figure 7C:
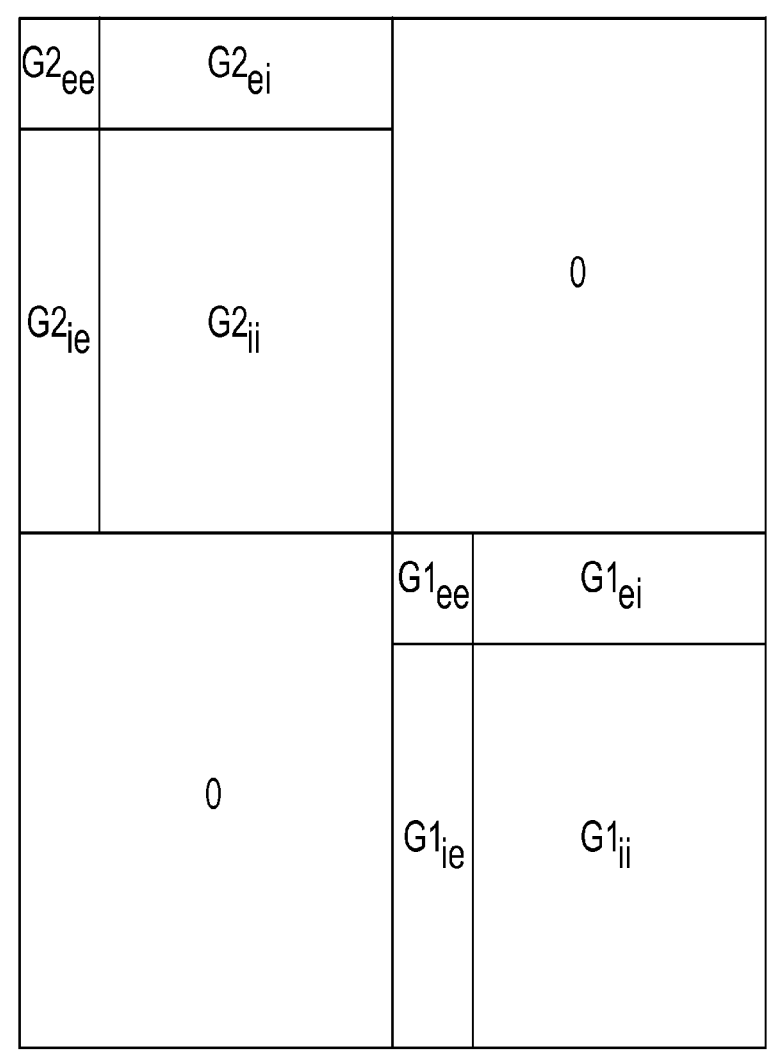

FIG. 7C shows the combined conductance matrix which results from the assembling of both elements.

The matrices G are arranged so as to be able to substitute $G1_{ee}$ (interface F1) in the assembled system. The intention is to be able to replace F1 with F2. This is why $G2_{ee}$, which contains F2, is placed ahead and $G1_{ee}$ is displaced in the internal network.

Heat dissipation due to convection and radiation phenomena may be modeled by an interface $H_{th}$ (FIG. 8) including resistances $r_h$ to flow transfer towards a reference mass at room temperature $T_a$. A model of an element may be connected to this dissipation model via its interface $FH_1$. The calculation of $r_h$ is the following:

$$\phi_{conv,rad} = h_{conv,rad} \cdot S \cdot \Delta T \quad (1)$$

$$\Rightarrow rh_{conv,rad} = \frac{1}{h_{conv,rad} \cdot S}$$

wherein:

$\phi_{conv,rad}$ is the convection and radiation flow, $\Delta T$ is the temperature difference on the surface, S is the exchange surface area on $F_{th}$, and $h_{conv,rad}$ is the heat conductivity of the ambient medium.

A connection of an interface H2 on an interface H1 is accomplished in the same way as in the case of the matrices F (FIG. 7C).

Figure 9:
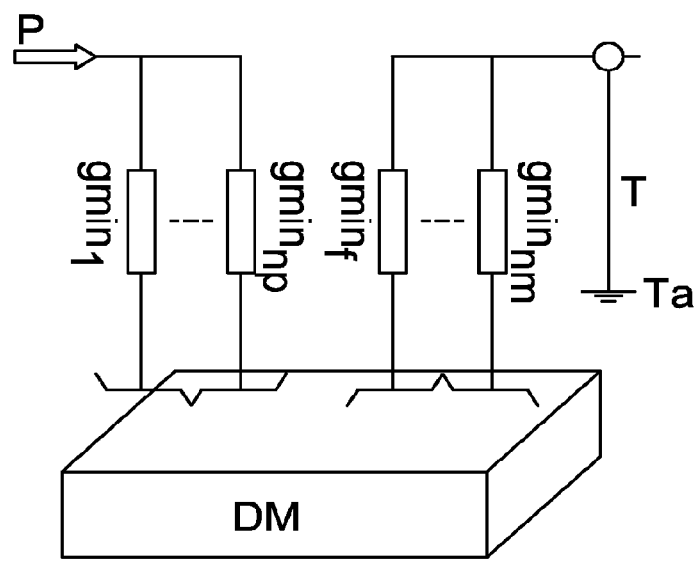

FIG. 9 represents a power injection and measurement interface. It represents the application of an average power source uniformly distributed on a surface and the measurement is the average of the temperatures, and this without biasing the system. The advantage is that the source may be applied in a single point, and only a single point per surface for the source and another point for the measurement are retained, i.e. two points per source-measurement surface. The resistances which are added for producing the average will then be reduced by compaction.

On a surface which includes $n_p$ meshing nodes, the power is distributed through small conductances $g_{min}$.

On a surface, the average temperature is measured by means of small conductances $g_{min}$.

Figure 10:
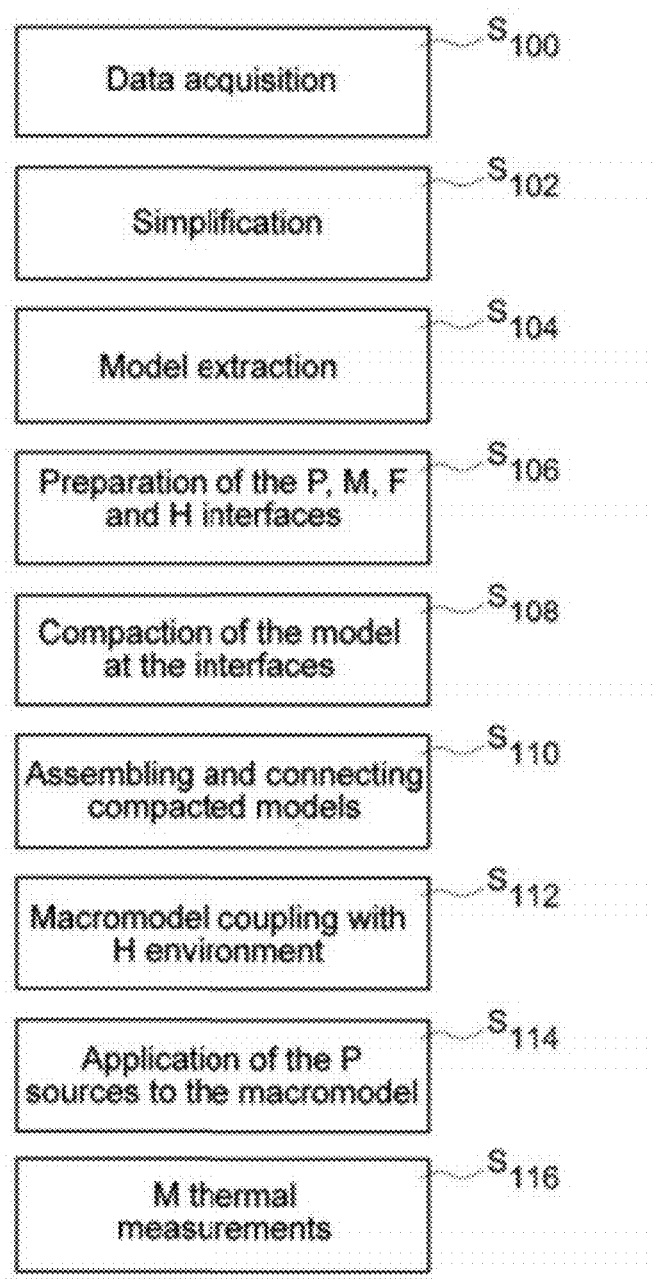

A exemplary method according to the invention is illustrated in FIG. 10 and includes the following steps.

In a first step (S100), data acquisition is performed.

These data are for example those from files with standard formats for transmission of 3D geometries for the mechanics of the components (example: DXF, GERBER, . . . ).

The geometrical data are then simplified as already explained above (second step (S102)).

A third step (S104) is the extraction of a model, which is a description of the dynamic thermal behavior of each relevant element. At this stage, the model is still too detailed.

Before reducing the model (S106), the numerical model may be prepared in order to preserve the nodes of interfaces P, M, F and H.

Next, (S108), it is sought to make this model compact, in order to accelerate the performances of the modeling of the whole of the system formed by the assembly of different compacted elements. The compacted model is called a micromodel.

In order to build a complete model (S110), it is possible to assemble models, and notably micromodels of different elements, as already explained above, in order to form a circuit. At this stage, the resulting model is called a macromodel. A macromodel may itself then be coupled since the interfaces subsist.

In order to prepare the simulation, the step S112 connects a simple model of heat transfer towards the environment.

The step S114 applies power sources on the nodes each representing a surface.

Finally (5116) measurements in M may be an application of the thereby formed complex model, in order to determine the thermal performances of the latter, and possibly for e.g. providing one of the illustrations of FIGS. 2A-2D.

We shall now describe in more detail the three following aspects of the invention.

The first aspect concerns the extraction of a thermal model with control of the accuracy (noted as Detailed Model or DM) by a numerical method (noted as MicroModels).

The second aspect relating to compacting the detailed model into a model, further called <<MicroModel>>, the latter having the same dynamic and static characteristics for a given observation space in frequency (control on accuracy: the compact model is valid from 0 Hz to Fmax, Fmax being the maximum frequency of the phenomena to be observed.).

A third aspect relates to the connection of the models to each other, with view to simulation. Once connected, the resulting model is called a Macromodel.

Another aspect which may be detailed later on, relates to hierarchical exploitation of a base of the models for thermal simulation.

As already indicated above, the initial data of the extraction of a thermal model (again a so-called detailed model or DM) include electric data and/or mechanical data, and/or data of the materials and/or data from electric and thermal simulations. These data may be written into files with various formats, such as those generated by the manufacturers of electronic components. Preferably, one takes the whole of the readers of these formats in order to fill the database.

The data which may appear therein may include for example:

data relating to materials, for example a list of materials and of properties of the materials, and/or data relating to geometry, for example a list of geometrical shapes, a list of apices, a list of edges, a list of polygons, and/or data relating to the interfaces, for example an interface name, and/or an index for identifying each face of a set of faces of the geometry of the component or of the circuit, and/or the list of the points which make up each face of a set of faces of the geometry of the component or of the circuit, and/or data relating to the meshing, for example a file containing the list of polygons, apices and edges, or data relating to the cutting up of the volume into small 3D cells, and/or matrices expressing the connection of the points of meshings in terms of conductances and capacitances, and/or the list of the interface nodes, and/or the two compact matrices which represent the two extracted matrices, and/or the list of the interface nodes to which a power source is applied, and/or the list of the interface nodes on which there is heat exchange, and/or the list of the surface nodes on which temperature is measured.

The formats and the readers are standard. The materials have properties attached to the geometrical shapes. There is one material per geometrical portion. In other words, the formats attach one material per geometrical element. For example, the "die" is a rectangular parallelepiped formed with 12 edges and 8 apices, the material of which may be silicon.

A geometrical portion corresponds to a component of the electronic system such as for example: the silicon, or the casing, or the adhesive, or the pins, or the air, or the printed circuit with the vias and the copper, or the discrete components, etc. . . .

Geometrical simplification steps have already been explained above.

During the extraction of the detailed model, it is sought to identify or localize the heat conduction paths, more specifically the conductive ($g_{ij}$) and capacitive ($c_{ij}$) paths, from a node i of the meshing to a node j of the meshing. For this, a mathematical system connecting the inputs (the source point P) and the outputs (measurement points M and/or F and H connection points) may be applied. At each input point, electric power is injected into the material or a heat source is assigned to this point. Measurement of temperature is conducted at each output point or external heat exchange connection point.

With numerical modeling techniques such as finite elements (FEM), or finite volumes (FVM), or finite differences (FDM) or boundary elements (BEM), the heat transfer functions may be expressed in mathematical form, from one point to the other of a meshing of the geometrical structure of a component (a meshing example is given in FIG. 3). It is therefore possible to form a linear system of equations which connects the temperature measurement in any point with the injected power in the system:

$(T, dT/dt) = f(P).$

It is from this equation that the conductance G and capacitance C matrices may be obtained.

As already seen above, the whole of the points (i,j) form a meshing. How to determine the size of the mesh to be selected is explained below.

The meshing of a volume is very fine if the thermal phenomenon to be measured is very fast, i.e. if the temperature spreads very rapidly and if a steady-state condition is reached rapidly.

Empirically, it is possible to estimate the fineness of the meshing by using the calculation of the diffusion delay of the heat flow in the material for flow in a very small volume V, for example a cubic volume:

$$\begin{cases} r_{ij} = \dfrac{e}{k \cdot S} \\ c_{ij} = \rho \cdot cp \cdot V \\ \tau_{ij} = r_{ij} \cdot c_{ij} \end{cases} \quad (4)$$

$$\Rightarrow$$

$$\tau_{ij} = \dfrac{\rho \cdot cp}{k} \cdot S$$

wherein:
e is the thickness of the volume,
k is the heat conductivity in Watts per Kelvin per meter ($W \cdot K^{-1} \cdot m^{-1}$)
S is the surface area for the relevant volume, a surface through which the temperature is measured and power is injected
$\rho \cdot cp$ is the volumetric heat capacity in Joules per cubic meter per Kelvin ($J \cdot m^{-3} \cdot K^{-1}$)
r is the thermal resistivity in Kelvins per Watt ($K \cdot W^{-1}$), and $\tau_{ij}$ is the delay of the signal between i and j, in seconds.

For a surface on which a power source is imposed (see for example in FIG. 3), the flow transfer frequency may be inferred by:

$$f = \dfrac{1}{\tau_{ij}} = \dfrac{1}{\beta \cdot S} \quad (5)$$

wherein f is the frequency in Hz, $$\beta = \dfrac{\rho \cdot cp}{k}$$

The example of the measurement of the temperature is considered on the junction of a component (like in FIG. 3) in silicon. If an applied power is considered on a surface of 0.1 mm² with $\rho \cdot cp = 1.75 \cdot 10^6$ $J \cdot m^{-3} \cdot K^{-1}$ and $k = 148$ $W \cdot K^{-1} \cdot m^{-1}$, a frequency $f = 846$ Hz is obtained.

It is possible to select a frequency, and the equation above allows definition of the size of a mesh with view to numerical modeling:

$$dx = \alpha \sqrt{\dfrac{1}{\beta \cdot f}} \quad (6)$$

wherein:
dx is the length of a mesh in meters (m);
$\alpha$ is a multiplicative coefficient such that $10^{-4} < \alpha < 10^{-1}$.

Usual numerical modeling methods provide a linear system. The setting up of equations is described later on. The multiplier coefficient $\alpha$ is introduced here in order to oversample the meshing and thereby obtain better results subsequently, notably for the compaction of the detailed model.

How to obtain the complex model of an element is now dealt with.

An equation connects each pair of meshing points as a complex number where:
the real part designates the static behavior, in other words the conductive behavior for temperature,
and the imaginary part represents the time-dependent variation due to an inertia effect of temperature.

In other words, regardless of the material or of the component, a breaking down of its thermal operation into both of these parts is sought, which will respectively be found again below in the form of the G matrix and of the C matrix.

Subsequently, it is possible to produce an analogy between a network of heat admittances and a network of electric admittances. These are connections expressed by complex numbers, only the signs may vary.

In the Laplace domain, the conductivity between two points i and j may be locally written as:

$y_{ij} = g_{ij} + j\omega c_{ij}$ (7)

wherein:
y is the heat admittance,
g is the heat conductivity,
$\omega = 2\pi f$ is the angular frequency,
c is the heat susceptance.

The whole of the meshing points forms a system of equations which may be assimilated to a network of connections of admittances connecting the power or heat sources applied to the system and unknown temperatures, which result from the heat injected by these sources, such that:

$\underline{GT} + \underline{C\dot{T}} = \underline{p}$ (8)

wherein:

G is the square matrix of heat conductances,

T is the vector of unknown temperatures; T dot is the time derivative of the vector T (dT/dt), C is the matrix of heat susceptances, p is the vector of the power or heat sources applied at the input.

The matrices G and C are symmetrical and defined to be strictly positive. These matrices are hollow with a very small number of connections per node. As a matrix is hollow, the number of connections per node is very small in front of the number of nodes. For example in FEM, the number of connections per node is of the order of 26 for 200,000 nodes.

Equation 5 written in the Laplace domain is:

$$(\underline{\underline{G}}+j\omega\underline{\underline{C}})\underline{T}=\underline{p} \qquad (9)$$

One may set:

$$\underline{\underline{Y}}=\underline{\underline{G}}+j\omega\underline{\underline{C}}$$

Y is the symmetrical invertible matrix of heat admittances.

The network of heat admittances Y is cut out into four parts showing the segment of the inputs-outputs (e) and the segment of the zero powers (i):

$$\underline{\underline{Y}} = \begin{vmatrix} Y_{ee} & Y_{ei} \\ Y_{ie} & Y_{ii} \end{vmatrix} = \begin{vmatrix} G_{ee} & G_{ei} \\ G_{ie} & G_{ii} \end{vmatrix} + j\omega \begin{vmatrix} C_{ee} & C_{ei} \\ C_{ie} & C_{ii} \end{vmatrix} \qquad (10)$$

with, $$\left(\begin{vmatrix} G_{ee} & G_{ei} \\ G_{ie} & G_{ii} \end{vmatrix} + j\omega \begin{vmatrix} C_{ee} & C_{ei} \\ C_{ie} & C_{ii} \end{vmatrix}\right)\begin{vmatrix} T_e \\ T_i \end{vmatrix} = \begin{vmatrix} p_e \\ p_i \end{vmatrix}$$

wherein:

$p_i=0$ e is the segment of the inputs-outputs.

block ee concerns the direct relationships between the input-output points.

i is the segment of zero powers.

block ii concerns purely internal relationships.

ie or ei represent the relationships between the input-output points and the internal network.

The dimension of the system 7 above is noted as n. The number of inputs-outputs is noted $n_e$ and the number of internal nodes of the meshing is noted as $n_i$. A meshing point is also called a node in order to relate it to a network of connections.

The connection of systems two-by-two will now be dealt with.

It is then sought to assemble two independent systems. As this will be understood subsequently, this is achieved by defining a conduction interface (Gee) of each of the two independent systems.

Given both models (noted as '1' and '2') with their respective connection interfaces G1ee and G2ee, one has two systems (11) cut out into four parts:

$$G1 = \begin{bmatrix} G1_{ee} & G1_{ei} \\ G1_{ie} & G1_{ii} \end{bmatrix} \quad 1 = \begin{bmatrix} C1_{ee} & C1_{ei} \\ C1_{ie} & C1_{ii} \end{bmatrix} \qquad (11)$$

$$G2 = \begin{bmatrix} G2_{ee} & G2_{ei} \\ G2_{ie} & G2_{ii} \end{bmatrix} \quad 2 = \begin{bmatrix} C2_{ee} & C2_{ei} \\ C2_{ie} & C2_{ii} \end{bmatrix}$$

In the Laplace domain, both independent systems ('1' and '2') are assembled (see FIG. 8C):

$$\begin{bmatrix} G1 & 0 \\ 0 & G2 \end{bmatrix}\begin{bmatrix} T1 \\ T2 \end{bmatrix} + j\omega\begin{bmatrix} C1 & 0 \\ 0 & C2 \end{bmatrix}\begin{bmatrix} T1 \\ T2 \end{bmatrix} = \begin{bmatrix} P1 \\ P2 \end{bmatrix} \qquad (12)$$

Let:

P1, be the powers vector on the interface 1,

P2, be the powers vector on the interface 2,

T1, be the temperature vector on the interface 1,

T2, be the temperature vector on the interface 2.

In order to couple the system '2' to the system '1', the temperatures at the interface of the latter are expressed as a function of the temperatures at the interface of '2' via a linear combination in the form of constraints, noted as X:

$$T1=X\cdot T2$$

$$\dot{T}1=X\cdot \dot{T}2 \qquad (13)$$

with X being symmetrical.

The sub-system of linear constraints X for example expresses the linear spatial interpolation of each point of interface F1 towards the closest neighbors of the interface F2.

The coupling method uses Lagrange multipliers λ1 and λ2 in order to introduce the coupling constraints set in equation (13) and (14) and leads to the following matrix system:

$$\begin{bmatrix} G11 & G12 & 0 & -I \\ G21 & G22 & 0 & X^T \\ 0 & 0 & 0 & 0 \\ -I & X & 0 & 0 \end{bmatrix}\begin{bmatrix} T1 \\ T2 \\ \lambda 1 \\ \lambda 2 \end{bmatrix} + \begin{bmatrix} C11 & C12 & -I & 0 \\ C21 & C22 & X^T & 0 \\ -I & X & 0 & 0 \\ 0 & 0 & 0 & 0 \end{bmatrix}\begin{bmatrix} \dot{T}1 \\ \dot{T}2 \\ \lambda 1 \\ \lambda 2 \end{bmatrix} = \begin{bmatrix} P1 \\ P2 \\ 0 \\ 0 \end{bmatrix} \qquad (14)$$

The Lagrange multipliers are then substituted to the system (14). By replacing T1 by means of (13), a connected system 15 is obtained which contains both sub-systems:

$$\underline{\underline{Cc}}\cdot T2 + \underline{\underline{Gc}}\cdot T2 = \underline{Pc} \qquad (15)$$

$$Gc = \begin{bmatrix} G22 & X^T\cdot G12 \\ G21\cdot X & X^T\cdot G11\cdot X \end{bmatrix}$$

$$Cc = \begin{bmatrix} C22 & X^T\cdot C12 \\ C21\cdot X & X^T\cdot C11\cdot X \end{bmatrix}$$

$$Pc = \begin{bmatrix} X^T P1 \\ P2 \end{bmatrix}$$

Finally, a single system equivalent to the system (8) is obtained, with coupling and assembling of two independent models. These equations express the behavior of the new system, which groups both initial systems. They are independent of the state of the systems, whether they are compacted (as this will be seen subsequently) or not.

How the interfaces of the system are prepared is now discussed.

In other words, the detailed model which was presented above will be modified in order to allow connection of power sources, measurements and of the other models while limiting the number of external nodes (ne) which are retained.

First there is a power input interface and a temperature measurement interface.

It is therefore assumed that the power sources P as well as the measurement points M are applied on one or more surfaces of the system (such as for example in FIG. 3).

It is sought to have only one external node per surface for injecting the power and a single node for measuring the surface temperature. Thus system Gd of the detailed model is encapsulated by a low conductance network such that:

$$G = \begin{bmatrix} 0 & 0 & P^T \\ 0 & 0 & M^T \\ P & M & Gd \end{bmatrix} \quad (16)$$

$$C = \begin{bmatrix} 0 & 0 & 0 \\ 0 & 0 & 0 \\ 0 & 0 & Cd \end{bmatrix}$$

with:
P a rectangular $m \times n_p$ matrix,
M a rectangular $m \times n_m$ matrix.

Wherein $n_p$ is the number of power sources and $n_m$ is the number of measurement points. The matrices M and P connect the external power and measurement nodes respectively, to the respective surface nodes, through very small conductances $g_{min}$, i.e of the order of one thousandth of the average of the conductances of the network. By analogy with electric systems, the network M acts as a voltmeter on a surface average and the network P uniformly distributes the input power over a surface (see FIG. 16). The matrices M and P are hollow, each column j of M or P has the value $g_{min}$ for all the meshing nodes of a surface j (in other words: all the nodes of a $j^{th}$ surface $P_j$ and $M_j$ have a $g_{min}$ which connects them to two new external nodes) of $Gd_{ee}$ and has the value 0 on the other hand.

Another interface is the interface H of the conductances with the environment.

As this has just been seen, the model is prepared for allowing the connection of two or several models together for heat exchange.

Figure 8:
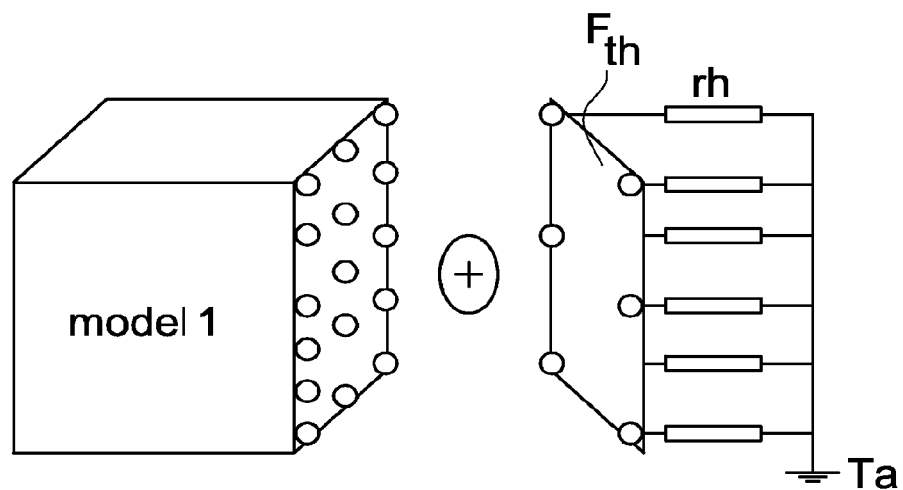

Removal of heat and heat radiation are modeled separately, by connecting a portion of a component to a so-called dissipation block. The dissipation block is a model of heat conductivity towards the reference room $T_a$ (as illustrated in FIG. 8).

The method according to the invention therefore preferably unifies the models by considering all the thermal interactions as heat transfers between models.

Finally, one or more connection interfaces F may be specified for each detailed model. An interface is defined by a sub-set of nodes on a face (see FIG. 6). The selected number of points for this interface determines the accuracy with which the flow is transmitted from one micromodel to another. With the uniformly distributed spatial sub-sampling of the surface nodes of the meshing, it is possible to limit the size of the micromodel being prepared. Thus the total number of interface nodes $n_e$ is much smaller than the square of the number of the total internal nodes ($n_i^2$) of the model (see FIG. 6). Selection of the nodes is made by considering first of all the value of the delay $\tau_{ij}$ (dissipation delay of the heat flow in the material) between two surface nodes. It is not necessary to calculate all the node-to-node transfer functions. Equation 5 allows setting of the maximum useful frequency; if the condition $\alpha=1$ is further set and if equation 6 is considered, the maximum distance between the interface nodes to be retained is inferred therefrom. Preferably, the minimum number of nodes of the connection interface is 5, distributed as illustrated in FIG. 6. This distribution (one point in each corner and one point at the centre or substantially at the centre) is the minimum number of points to be retained, since the heat flow comes from the edges or from the centre. If only the four corners are taken and if the source comes from the centre (but on the opposite side), the heat peak which is at the centre will not be taken into account. Thus, an interface of reduced size is obtained.

An interface is therefore assimilated to a simple planar model with G void and C void. It replaces the part $G_{ee}$ and $C_{ee}$ of the detailed model (part $G2_{ee}$ and $C2_{ee}$, see FIG. 7C).

Thus, the detailed model contains a sub-set of external nodes being used for connecting other models.

Taking into account the resources which would be required for applying the detailed model, it is sought to reduce the latter. How the compact complex model is found is therefore now explained. It was already indicated above that the actual interfaces are of the reduced size. So there remains to reduce the inner portion of the system.

During the compaction step, the equation (10) is processed in the Laplace domain. A reduction in the dimension of this system is sought in this domain.

The retained reduction criterion may be the maximum observation frequency $f_{max}$ (Hz) of the thermal phenomena to be analyzed (with $\omega_{max}=2\Pi f_{max}$). The compaction uses a method of projection of the system on a reduced frequency base, borrowed from the field of electromagnetism, described in the article of Kevin J. Kerns and Andrew T. Yang, Stable and Efficient Reduction of Large, Multi port RC Networks by Pole Analysis via Congruence Transformations, Proceeding DAC-ACM, 1996.

During a first step (or transformation step) the system (10) is transformed so as to obtain an internal sub-network in $G_{ii}^{-1}C_{ii}$, the unit of which it time.

During a second step (analysis), a numerical analysis of the transformed internal network so as to extract therefrom the reduced projection base by selecting the eigenvalues (or poles $g^{-1} \cdot c$) is performed.

During a third step (reduction by projection), the transformed system is projected on the reduced base, while preserving the direct terms (input-output connections).

During the fourth step, the matrices are expressed as a network of resistive and capacitive connections.

Each of these steps is described below.

During the transformation, factorization of G in (10) is a congruence transformation which preserves the direct terms (ee), which does not modify the eigenvalues and which diagonalizes the internal part ii:

$$\underline{Y}' = \underline{V}^T \underline{Y} \underline{V} \quad (17)$$

$$\Rightarrow \underline{Y}' = \underline{G}' + j\underline{C}'\omega$$

with, $$\underline{\underline{G}}' = \begin{vmatrix} G'_{ee} & 0 \\ 0 & I \end{vmatrix}$$

$$\underline{\underline{C}}' = \begin{vmatrix} C'_{ee} & C'_{ei} \\ C'_{ie} & C'_{ii} \end{vmatrix}$$

$$G'_{ee} = G_{ee} - G_{ei}L^{-T}L^{-1}G_{ie}$$

-continued $$C'_{ee} = C_{ee} - C_{ei}L^{-T}L^{-1}G_{ie} + G_{ei}L^{-T}L^{-1}[C_{ii}^{-T} - C_{ie}]$$

$$C'_{ie} = L^{-1}[C_{ie} - C_{ii}L^{-T}L^{-1}G_{ie}]$$

$$C'_{ei} = (C'_{ie})^T$$

wherein $G_{ii} = LL^T$ is the Cholesky decomposition,
V is the congruence factor:

$$V = \begin{vmatrix} I & 0 \\ -L^{-T}L^{-1}G_{ie} & L^{-T} \end{vmatrix}$$

wherein I is the identity matrix, and $C'_{ii} = L^{-1}C_{ii}L^{-T}$

At this stage, the member $C'_{ii}$ contains the poles to be extracted in the same unit as $g^{-1} \cdot c$ and being used as a reduction criterion for the internal part of the network.

For the analysis step, it is recalled that the reduction criterion is related to $f_{max}$, as indicated above, and that it will be used for controlling the extraction of the eigenvalues and the stopping of the iterations. The eigenvalue and eigenvector analysis of the hollow symmetrical matrix $C'_{ii}$ enables extraction of a reduced projection base U such that:

$$L^{-1}C_{ii}L^{-T}\cdot U_j - \lambda_j \cdot U_j < \epsilon \quad (18)$$

For the $j^{th}$ eigenvalue $\lambda_j$ $\epsilon$ is the accuracy of the machine (which in principle depends on the machine but it is possible to assume $10^{-17}$ for example, and check this with the machine).

Further one has: $j \ll n_i$

The eigenvalues are arranged in decreasing order as well as the associated eigenvectors. It is assumed that the number $n_i'$ of extracted eigenvalues is much smaller than the dimension $n_i$ of the internal sub-network.

The numerical analysis method is based on the Lanczos decomposition.

A wise selection should be made as regards this method. Indeed, a method with systematic re-orthogonalization is preferably selected, as described in the article of Jones, Mark T. and Patrick, Merrell L., Institute for Computer Applications in Science and Engineering. 1990 LANZ, Software solving the large sparse symmetric generalized eigenproblem. Institute for Computer Applications in Science and Engineering, NASA Langley Research Center, Hampton, Va. This applies for a matrix of small dimension (for example with a size <10,000 nodes).

For very large matrices (for example a size >10,000 nodes), a iterative blockwise method is selected as described in Parlett B. N. and Scott D. S. (1979): The Lanczos algorithm with selective orthogonalization. —Math. Comp., Vol. 33, No. 145, pp. 217-238 or in the article of Mario Rosario Guarrcino and al. A Parallel Block Lanczos Algorithm and its Implementation for the Evaluation of some eigenvalues of large sparse symmetric matrices on multi-computers. Int. J. Appl. Math. Comput. Sci., 2006, Vol. 16, No. 2, 241-249 or in the article of K. Wu et al. A parallel Lanczos method for symmetric generalized eigenvalue problems, Technical Report LBNL-41284, National Energy Research Scientific Computing Division, Lawrence Berkeley National Laboratory, Berkeley, Calif., 1997.

As this is an iterative method, the advantage is that it is not necessary to extract the whole of the eigenvalues. The order of arrival of the values (from the largest to the smallest) is monitored and the process is stopped as soon as the eigenvalue becomes smaller than ½Πfmax. In other words, only eigenvalues which are greater than $(2\pi fmax)^{-1}$ are retained.

During the reduction by projection, the reduced base U is projected on the parts of the internal network C'ie, C'ei and C'ii. One therefore obtains:

$$C'' = \begin{vmatrix} I & 0 \\ 0 & U^T \end{vmatrix} \begin{vmatrix} C'_{ee} & C'_{ei} \\ C'_{ie} & C'_{ii} \end{vmatrix} \begin{vmatrix} I & 0 \\ 0 & U \end{vmatrix} \quad (19)$$

$$\Rightarrow C'' = \begin{vmatrix} C'_{ee} & C'_{ei}U \\ U^T C'_{ie} & \Lambda \end{vmatrix}$$

$$\Lambda = \begin{vmatrix} \lambda_1 & 0 & 0 \\ 0 & \dots & 0 \\ 0 & 0 & \lambda_{ni'} \end{vmatrix}$$

Thus, the dimension n of the detailed system is reduced to $n' = n_e + n'_i$, with $n' \gg n$ (the $n'/n$ ratio may be at least 1/1,000 or comprised between 1/1,000 and 1/100). Nodes with a rank above n'i are suppressed in G' (see (17)).

The compacted models may then be connected together.

The numerical base contains the compact matrices for the following compact micromodel system:

$$\underline{\underline{Y''}} = \begin{vmatrix} Y''_{ee} & Y''_{ei} \\ Y''_{ie} & Y''_{ii} \end{vmatrix} = \begin{vmatrix} G'_{ee} & 0 \\ 0 & I \end{vmatrix} + j\omega \begin{vmatrix} C''_{ee} & C''_{ie} \\ C''_{ie} & \Lambda \end{vmatrix} \quad (20)$$

The following matrices may be stored in memory:
$G'_{ee}$, $C''_{ee}$, $C''_{ie}$ The vector vp of the eigenvalues which are on the diagonal of $\Lambda$ may itself also be stored in memory.

These matrices were densified during the calculation but remain symmetrical and defined as strictly positive.

It is now possible to achieve connection of the compacted models, by using the technique which was described above. In fact a connection of two micromodels, i.e. two compact systems, is in fact sought.

Given two compact micromodels (noted as '1' and '2') with their respective connection interfaces $G'1_{ee}$ and $G'2_{ee}$, two microsystems are obtained, cut out into four parts:

$$G1 = \begin{bmatrix} G1'_{ee} & 0 \\ 0 & I \end{bmatrix} \quad C1 = \begin{bmatrix} C1'_{ee} & C1''_{ei} \\ C1''_{ie} & \Lambda 1 \end{bmatrix} \quad (21)$$

$$G2 = \begin{bmatrix} G2'_{ee} & 0 \\ 0 & I \end{bmatrix} \quad C2 = \begin{bmatrix} C2'_{ee} & C2''_{ei} \\ C2''_{ie} & \Lambda 2 \end{bmatrix}$$

For assembling two micromodels, G2 is replaced with the expression (21) in equation (20) by re-organizing G2 so as to isolate the interface nodes $G2'_{ee}$:

$$G = \begin{bmatrix} G2'_{ee} & 0 & 0 & 0 \\ 0 & I & 0 & 0 \\ 0 & 0 & I & 0 \\ 0 & 0 & 0 & G1'_{ee} \end{bmatrix} \quad (22)$$

$$\Leftrightarrow G = \begin{bmatrix} G11 & G12 \\ G21 & G22 \end{bmatrix}$$

-continued with $$G22 = \begin{bmatrix} G2'_{ee} & 0 & 0 \\ 0 & I & 0 \\ 0 & 0 & I \end{bmatrix}, G12 = \begin{bmatrix} 0 \\ 0 \\ 0 \end{bmatrix}$$

$$G21 = [0 \ 0 \ 0], G11 = G1'_{ee}$$

FIGS. 7A-7C show the strategy for assembling both systems. The interface of the system '1' will be substituted after introducing the interface of the system '2'. Indeed, block G22 contains the interface of the system '2' plus the internal parts of both systems.

Similarly, the following is obtained for C2:

$$C = \begin{bmatrix} C'2ee & C''2ie & 0 & 0 \\ C''2ei & \Lambda 2 & 0 & 0 \\ 0 & 0 & \Lambda 1 & C''1ei \\ 0 & 0 & C''1ie & C'1ee \end{bmatrix} \quad (23)$$

$$\Leftrightarrow C = \begin{bmatrix} C11 & C12 \\ C21 & C22 \end{bmatrix}$$

with $$C22 = \begin{bmatrix} C'2ee & C''2ie & 0 \\ C''2ei & \Lambda 2 & 0 \\ 0 & 0 & \Lambda 1 \end{bmatrix}, C12 = \begin{bmatrix} 0 \\ 0 \\ C''_{ie} \end{bmatrix}$$

$$C21 = [0 \ 0 \ C''_{ei}], C11 = C1'_{ee}$$

By analogy of the components of equation (20) in equation (14), the coupled system (24) of both micromodels is obtained after compaction:

$$\begin{bmatrix} G2'_{ee} & 0 & 0 & 0 \\ 0 & I & 0 & 0 \\ 0 & 0 & I & 0 \\ 0 & 0 & 0 & X^T \cdot G1'_{ee} \cdot X \end{bmatrix} \underline{T1} + \quad (24)$$

$$\begin{bmatrix} C2'_{ee} & 0 & 0 & 0 \\ 0 & \Lambda 2 & 0 & 0 \\ 0 & 0 & \Lambda 1 & C1''_{ei} \cdot X \\ 0 & 0 & X^T \cdot C1''_{ie} & X^T \cdot C1''_{ee} \cdot X \end{bmatrix} \underline{\dot{T}1} = \underline{P1}$$

After re-organization of the last two lines in the Laplace domain, the general coupled system for input powers P and unknown temperatures T is the following system (25):

$$\left( \begin{bmatrix} G2'_{ee} & 0 & 0 \\ 0 & X^T \cdot G1'_{ee} \cdot X & 0 \\ 0 & 0 & I \end{bmatrix} + j\omega \begin{bmatrix} C2'_{ee} & 0 & 0 \\ 0 & X^T \cdot C1''_{ee} \cdot X & C1''_{ei} \cdot X \\ 0 & X^T \cdot C1''_{ie} & \Lambda \end{bmatrix} \right) \underline{T} = \underline{P} \quad (25)$$

with $$\Lambda = \begin{bmatrix} \Lambda 2 & 0 \\ 0 & \Lambda 1 \end{bmatrix}$$

The terms of the compact model are obtained here on the one hand, the connection terms on the other hand.

The exploitation of the base of the models is now described.

The latter contains the information on the construction and exploitation of numerical models.

The hierarchy of the models is illustrated by a dependence tree which symbolizes the faces of each micro- or macro-model which are connected together two-by-two.

The connection with the environment is described below.

A micromodel includes information on its structure ($n_e$, $n_i$) and on the compact system of equations of heat admittances (see equation (25)). It also contains the interfaces F (see FIG. 6) for connection 5 with the other micromodels and with the environment H. Heat exchange with the environment is carried out through H. Exchanges with the environment are imposed on the segment H of the numerical model. This exchange is a parameter and is noted as $gh_j$ for each interface $H_j$. The value of this parameter is calculated as a function of the exchange coefficient (h) and of the exchange surface area (s), such that:

$$gh_j = h_j * s_j \quad (26)$$

gh in $W \cdot K^{-1}$
with h in $W \cdot m^{-2} \cdot K^{-1}$
and s in $m^2$

This means that the micromodel base contains the surface information ($s_j$) for each interface $H_j$ and the $h_j$ are parameters of the micromodel which the user may modify. In order to represent the heat exchange between the micromodel or the macromodel with the outside world, it is sufficient to define a simple model of the external environment in the form of a set of leakage heat conductances $g_h$ making a direct connection between the external nodes of $G2_{ee}$ and the thermal reference $T_a$ (see FIG. 4). The <<Environment>> model is simply a diagonal matrix of heat conductances and C2 is void. The connection of the micro/macro model (G1, C1) with G2 is then accomplished by means of equation (25).

Once the base of the models is filled, it is considered that one micromodel is available per material. The properties of the material are such that the conductivity varies with temperature (output of the model). The first order variation (coefficient K) is sufficient enough and is integrated to the numerical model:

$$G'' = G' \cdot (I + \kappa \cdot \Gamma_{t-1}) \quad (27)$$

wherein $\Gamma_{t-1}$ is the symmetrical matrix of temperature averages in any point:

$$\Gamma_{t-1}(i, j) = \frac{T_{t-1}(i) + T_{t-1}(j)}{2}$$

The (Euler implicit) formula for calculating the temperature is given here as a function of discrete time (t), for a micromodel:

$$T_t = \left( G' \cdot (I + \kappa \cdot \Gamma_{t-1}) + H_{conv,rad} + \frac{C'}{dt} \right)^{-1} \left( P + \frac{C'}{dt} \cdot T_{t-1} + Ta \right) \quad (28)$$

wherein
$H_{conv,rad}$ is the diagonal matrix of the conductances with the environment (see FIG. 8).
$T_a$ is the ambient temperature.
I is the identity matrix.

The method is validated on an actual case from the semiconductor industry. The electronic circuit comprises an integrated circuit and discrete components on a printed circuit. The goal is to measure the thermal distribution of the heat on the silicon portion. The validation is conducted by measuring the absolute error on the measurement by comparing the simulations of the detailed model (FEM numerical method) with the measurements on the macromodel. In order to sweep through the whole of the signals, the sources are clock signals.

The whole of the circuit is divided into six portions which are the micromodels:
the printed circuit with the copper tracks, the insulator and the "vias",
the power sources of the discrete components on the printed circuit (see FIG. 11),
the casing of the integrated circuit IC (see FIG. 12),
the metal portions of the IC,
the silicon of the IC (see FIG. 4),
the dissipation block around the IC.

Once the micromodels are coupled together with the FCTM, six power sources are applied and the surface temperature average is measured in M1, M2 and M3. The ambient temperature is 150 degrees Celsius and the total injected power is 7 Watts. Dissipation by convection is 8 $W/(m^2 \cdot ° C.)$.

Figure 12:
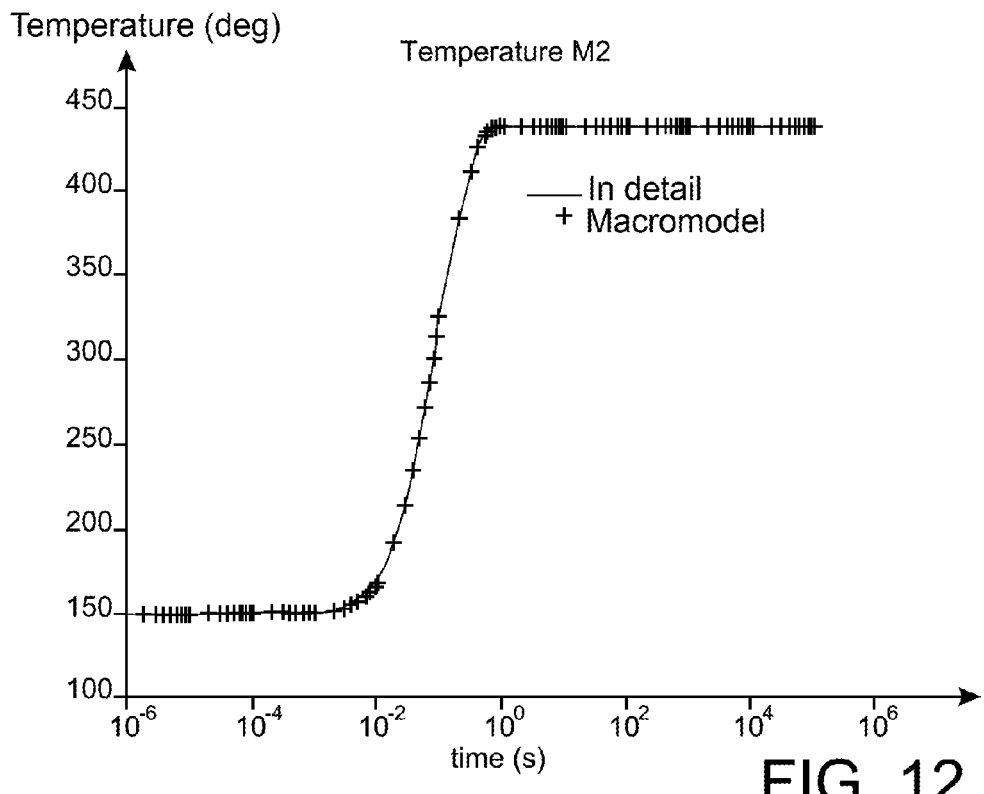
Figure 13:
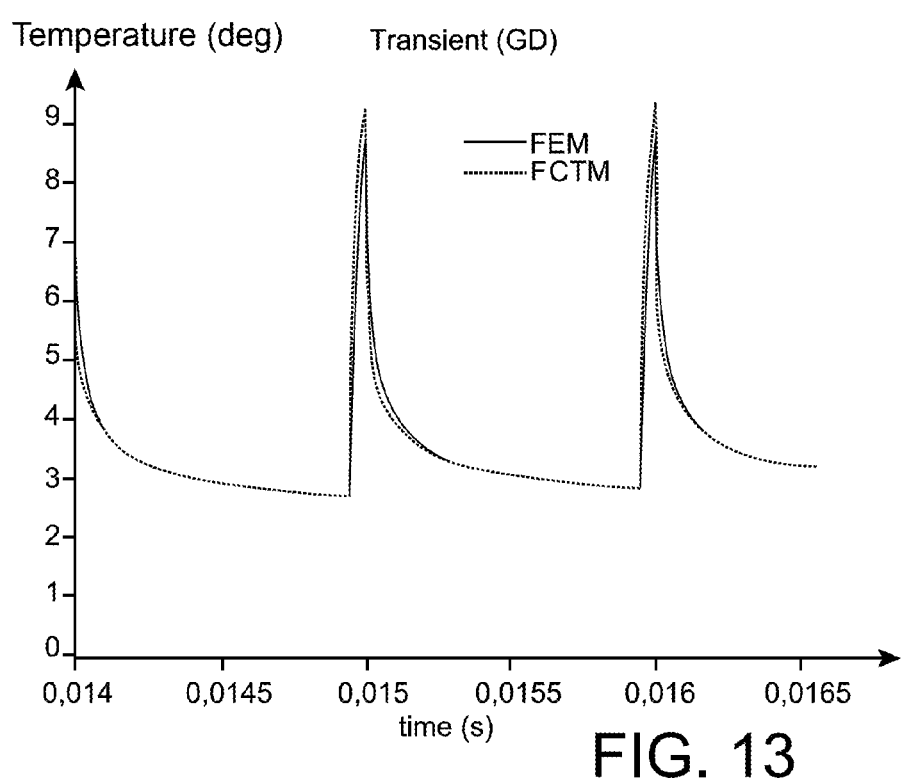
Figure 14:
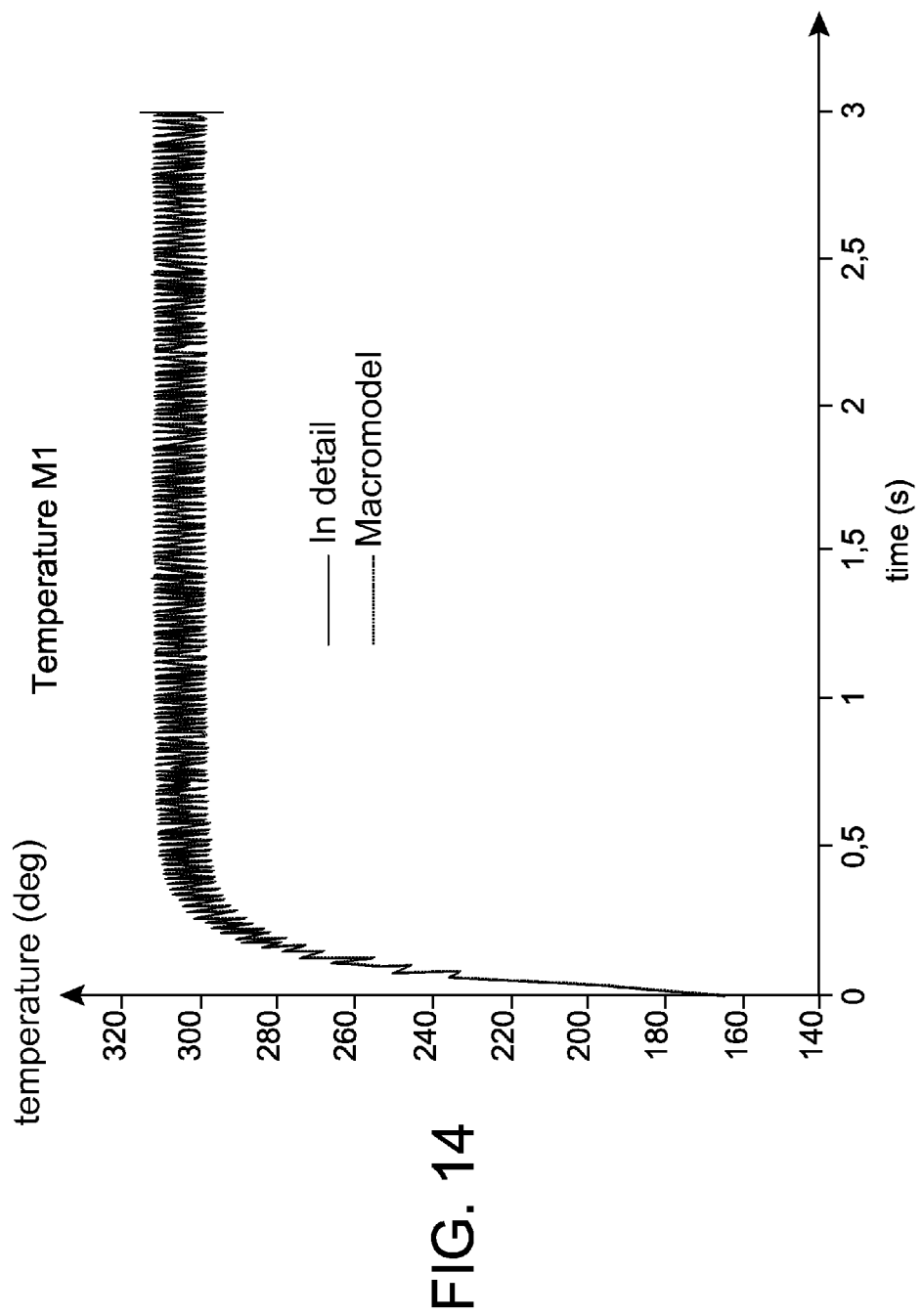

FIGS. 12-14 show the results obtained. These figures show a very small error on a complete circuit. It is noted that the stationary temperature due to the accumulating effect of the model is very accurate. It should also be noted that the simulation time of the detailed model exceeds one day for six thousand points, whereas the simulation time of the macromodel, obtained by a method according to the invention, does not exceed one minute. Thus, the user has time for redoing several simulations, by changing the convective parameters for example.

In FIG. 12, a measurement of the temperature of the silicon is illustrated, as well as a comparison between a simulation on the detailed model and on a compact model. The power source is a square signal. The maximum absolute error measured is 0.1° C.

In FIG. 13, another measurement of the temperature of the silicon is illustrated, as well as a comparison between a simulation on the detailed model and on a compact model. This time, the power source from a time point of view, is a clock signal. The maximum absolute error measured is 1.2° C.

In FIG. 14, another measurement of the temperature of the silicon is illustrated as well as a comparison between a simulation on the detailed model and on a compact model. There again the power source from the time point of view, is a clock signal. This time, the error on the stationary temperature measurement after a long period (3 seconds) is quite negligible.

A method according to the invention also allows generation of a database of the hierarchical type.

Figure 20:
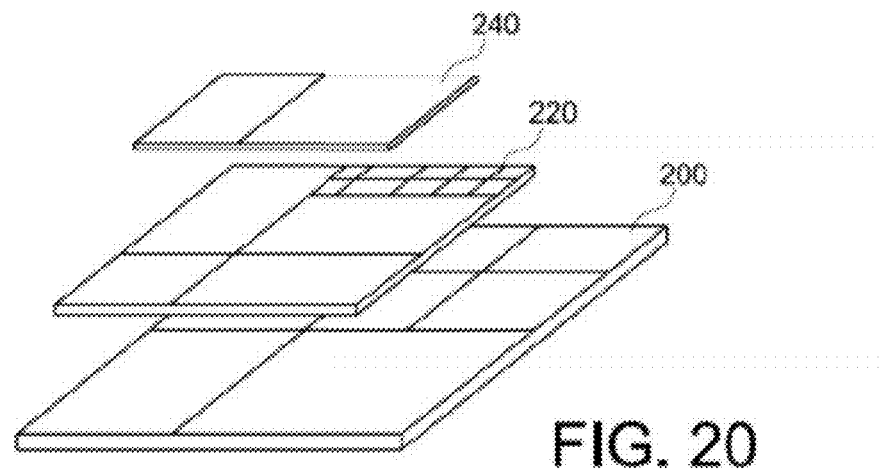

The generation and operation of this database may be explained in connection with FIG. 20.

A method for constructing both compact and flexible thermal models (FCTM) according to the invention, builds the models and feeds the base with the models.

At the lowest level, the detailed model 200 notably contains geometrical construction data, and for example physical data. Examples of these data have already been given above. It also includes fine meshing of the component. These data take up too much space on a data storage disk. Further, there are millions of nodes in such a model and the whole is therefore much more unmanageable.

At an upper level 220, each system of equations of the detailed model is compacted and interfaced in order to be independent of the boundary conditions. It is the application of the method which has been described above. A micromodel is therefore formed for each component or circuit or for each portion of component or circuit consisting of a single material. This level takes up much less space than the lower level (about 10% of the space of the lower level). A compacted model allows increase in the performances of the method. Such a compacted model, or micromodel, is somewhat a base element for constructing more elaborate models.

The level of the macromodels 240 contains models consisting of micromodels, which stem from the level 220, and which are then connected together. A macromodel represents an electronic component. Two macromodels may be interfaced with each other and are independent of the boundary conditions. They may be combined in a complete electronic system. A connection of two models means putting an F1 connection interface area of the first model in contact with an F2 connection interface area of the second model.

In the organization of this base, the most elaborate models are macromodels. The latter consist of micromodels connected with each other through their connection interfaces. The models are then again connected together in order to either model an integrated circuit with its environment, or a whole electronic circuit including the printed circuit. The composition of macromodels with each other may again define a new macromodel. The modelling method according to the invention is recursive.

Figure 21:
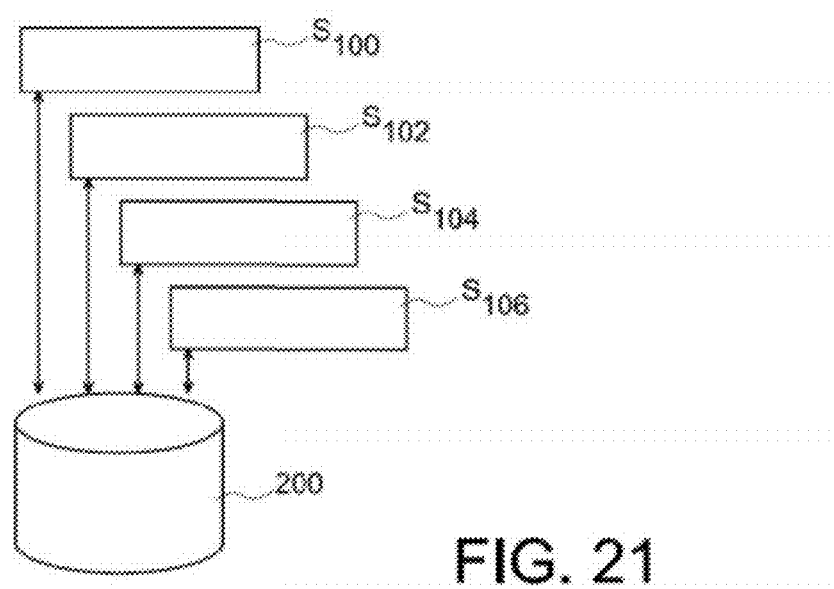

An exemplary method according to the invention applying the database discussed above is illustrated in FIG. 21. Certain steps are similar to those already described above in connection with FIG. 10, but this time they are explained in connection with the base 200.

During a first step (S100), acquisition of the data is performed for feeding the base 200.

The geometrical data are then simplified as already explained above (S102): the data are extracted from the base, and then re-injected into the latter in simplified form.

During a third step (S104) extraction of a model is accomplished, which is a description of the dynamic thermal behavior of each relevant element. There again, this step is carried out from data of the base 200. The obtained model is re-injected into the base 200.

In order to prepare the following step, the characteristics of the model are read into the base 20 in order to define in the base the nodes of interfaces P, M H and F by re-organizing the numerical description according to FIG. 4.

Step S108 will allow this model to be made compact, in order to accelerate the performances of the modeling of the whole of the system formed by the assembly of the different elements. The detailed model is extracted from the base 200, compacted and put back in compact form into the base 200.

The steps of FIG. 10 may be applied:
thus, in order to exploit the base for building more complex models, step S110 leaves it up to the user to select and define the relationships between the selected model. They will be automatically connected together and the results stored as a new macromodel,
in order to prepare the upstream simulations, the boundary conditions according to the simulation environment, are inputted by the user and the model may again be coupled in S112 with this environment.

In a method according to the invention, each micromodel is built in an isolated way. In order to simulate it, outward (i.e. toward the simulation environment) transfer connections are added. In order to combine the micromodels together, each micromodel is valid, regardless of the environment in which it is used. "valid" means that the model represents the actual behavior of the component or the circuit whatever the environment. It also means that the thermal behavior of the model is adapted to any other environment. If one changes a parameter in the system a measurement is in accordance with the physical behavior of the system. For example of a circuit is modeled when it is on a board and one changes the board one does not need to recalculate the behavior of the circuit. Same applies if one changes the heat transfer coefficients and/or the composition of ambient air. One must not have to recalculate the model but just connect the already calculated model to the new environment.

Also, the values of the sources may be inputted by the user and the uniform application of the sources is accomplished in S114 on the model. This model is ready to be simulated.

The base 200 may provide data to a set of analysis methods 201 for exploiting the base from measurement interfaces M. Equation 28 is a time-dependent simulation example. Results are provided in FIGS. 12, 13 and 14. At this stage, a compact and parameterized multi-source complete model is obtained (since it is possible to vary the boundary conditions).

FIG. 15A illustrates a microcomputer 420 configured in a suitable way for processing information relating to a circuit in accordance with a method according to the invention.

The data of components or circuits are parameters, in an initially considerable number, and which make up an initial description of the whole circuit.

Reduced modeling is used, as explained above, in particular by reducing the matrices G and C as explained above. Thus, FCTM modeling may operate on a so-called "personal" computer, without requiring a calculation cluster.

The simulator gives the possibility of seeing how the circuit behaves from a thermal point of view, both from a static point of view and a dynamic point of view, from an input in the form of multiple power or heat sources (simultaneously) applied in different points or surfaces of a circuit. A method and a device according to the invention are therefore multisource.

A method according to the invention is further independent of the boundary conditions.

The microcomputer 420 includes a calculation section with all the electronic components, software packages or other packages, required for simulating the behavior of the circuit.

Figure 15B:
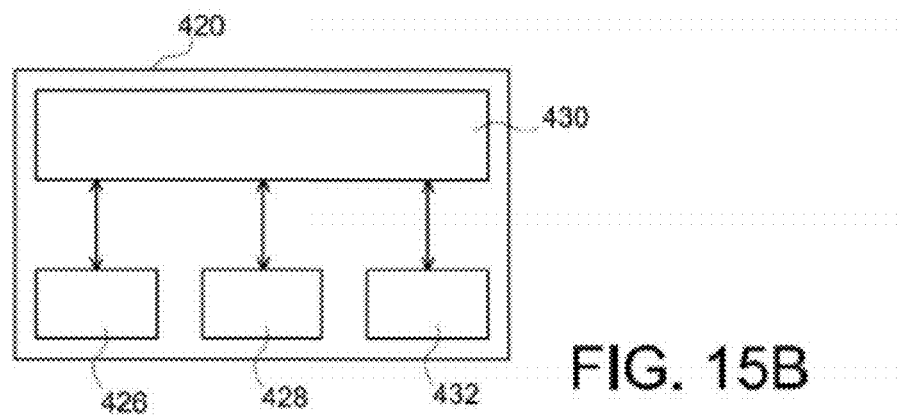

Thus, for example (FIG. 15B), the system 420 includes a programmable processor 426, a memory 428 and an input peripheral, for example a hard disk 432 coupled to a system bus 430. The processor may for example be a microprocessor, or a processor of a central processing unit or of a graphic work station. The memory 428 may for example be a hard disk, a read-only memory ROM, a compact optical disk, a dynamic random access memory DRAM or any other type of RAM memory, a magnetic or optical storage element, registers or other volatile and/or non-volatile memories. Processing algorithms according to the invention, algorithms for calculation from circuit data, include instructions which may be stored in the memory, and with which simulations may be carried out as described above on a reduced circuit according to the invention, in accordance with any of the embodiments of the present invention. The data of the database 200 may be stored in memory in a memory area of this system.

A program, with which the method according to the invention may be applied, is resident or recorded on a medium (for example: a diskette or a CDROM or DVDROM or removable hard disk or magnetic medium) capable of being read by a computer system or by the microcomputer 420.

The microcomputer 420 may also be connected to other peripheral devices, such as for example printing devices. It may be connected to an electronic network of the Internet type, over which data relating to the simulation results may be sent.

Figure 2D:
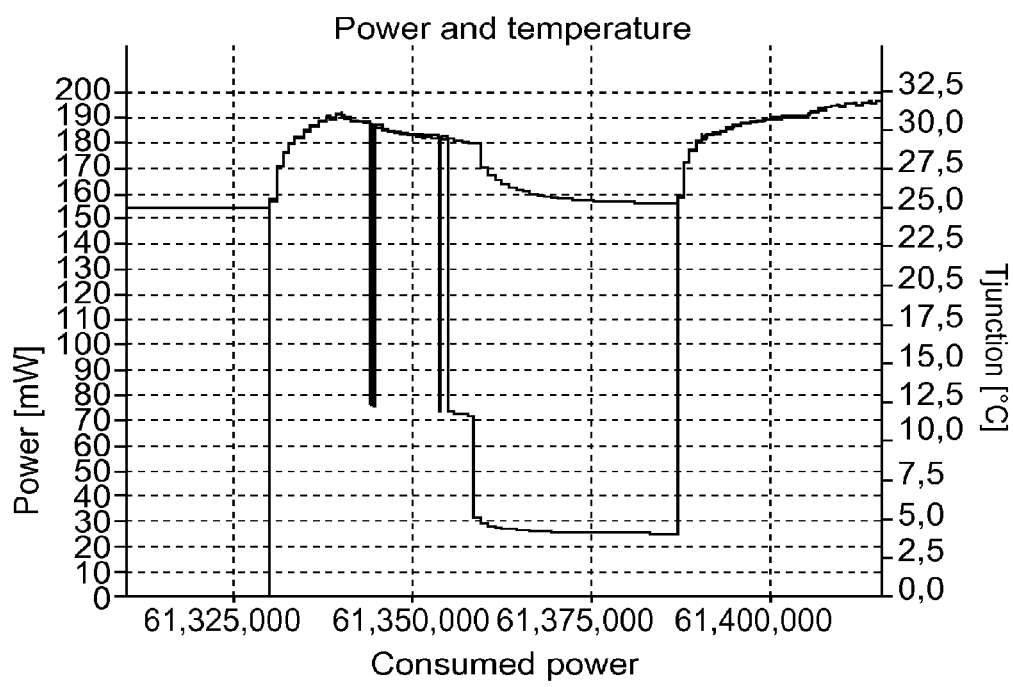

It is possible to display on the screen 422 an image representative of a simulation result, for example of the type of one of those illustrated in FIGS. 2B-2D and on which comments have already been made above. It is also possible to represent comparison or modeling curves such as those of FIGS. 12-14.

Figure 1:
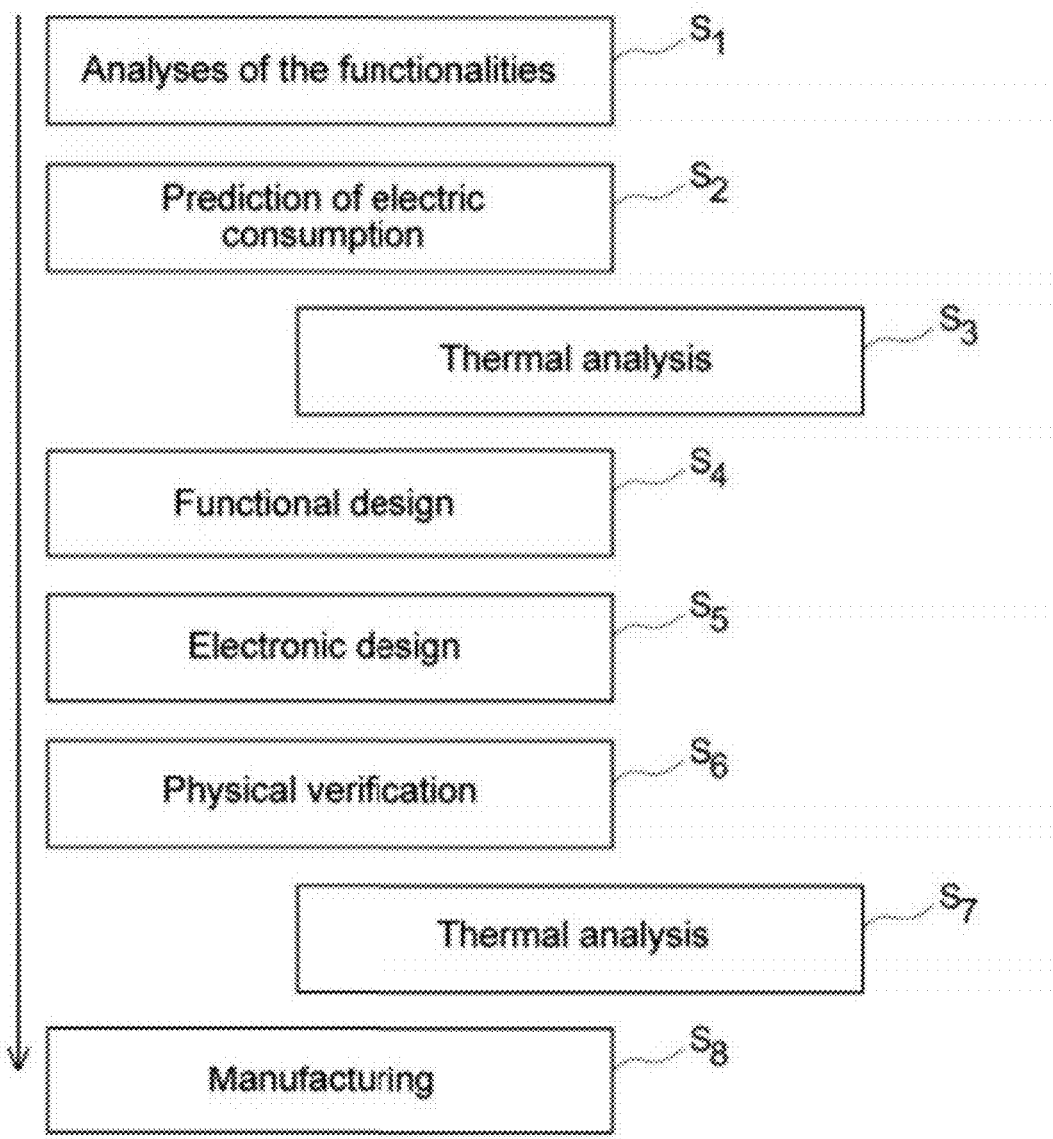

Once the circuit is tested to the satisfaction of the designer, it may be designed (steps S4-S5 of FIG. 1) and physically tested (step S6). A second thermal verification may take place (step S7) and then the circuit may be manufactured (step S8).

Means for manufacturing the circuit, such as those which are known in the semiconductor and integrated circuit industry, may then be applied, from the moment that the simulation result obtained with a simulation device according to the invention is satisfactory.

A method and device according to the invention therefore play an important role in the manufacturing of an integrated circuit, since they provide considerable savings in time in the elaboration and manufacture of such a circuit.

The invention claimed is:

1. An automated method that creates a compact and flexible model of an electronic system, exploring the electronic system's thermal behavior and manufacturing the electronic system, including the steps of:
   a) breaking down the electronic system model into parts of the electronic system, each of the parts being in a single material and being represented as a detailed model comprising at least:
      a mesh, wherein the size of the mesh of at least one of the parts is defined as a function of a transfer frequency of heat flow in an elementary volume of the part,
      a heat admittance system,
      a heat transfer interface, comprising heat transfer interface nodes connected to an ambient air environment model comprising a set of leakage heat conductances,
      a connection interface, comprising connection interface nodes connected to at least one other model,
      a power multi-source interface, comprising power interface nodes, and
      a temperature measurement interface, comprising temperature measurement nodes;
   b) reducing of each of a plurality of the detailed models into a compact model by controlling the maximum of a heat flow frequency, thereby forming a plurality of compact models;
   c) interpolating nodes of at least one of the heat transfer interface, connection interface, power multi-source interface, and temperature measurement interface of at least one of the detailed models and coupling of at least two of the plurality of compact models into a macromodel;
   d) forming the compact and flexible thermal model through reducing the macromodel;

e) exploring the electronic system's thermal behavior by iteratively: applying an average power distributed on a surface of the heat transfer interface to at least two of the heat transfer nodes, performing a simulation of the static and dynamic thermal behavior of the compact and flexible thermal model on a microprocessor, and measuring a temperature of at least two nodes of the temperature measurement interface;

f) modifying a position of at least one component in the macromodel; and g) manufacturing an electronic system having the static and dynamic thermal behavior of the macromodel specified in the iteration of step e).

2. The method according to claim 1, wherein the coupling of at least two of the compact models comprises coupling with constraints, making the compact models compatible.

3. The method according to claim 1, wherein the interface nodes are reduced by coupling and interpolation between an original face and another simplified 2-dimensional face.

4. The method according to claim 1, wherein step b) achieves a reduction level of more than 80% of at least one of the plurality of detailed models.

5. The method according to claim 1, including a preliminary step for simplification of the geometrical description of at least one of the parts.

6. The method according to claim 1, wherein in case of an unsatisfactory result of the simulation, further comprising replacing at least one detailed model of at least one part of the electronic system by at least one different detailed model of the at least one part without modifying the detailed model of at least one other part of the electronic system.

7. A device that creates a compact flexible thermal model of an electronic system, including a microcomputer configured to:

a) break down a representation of the electronic system model into parts of the electronic system, each of the parts being in a single material and being represented as a detailed model, comprising at least:
at least one mesh, wherein the size of the at least one mesh of at least one of the parts is defined as a function of a transfer frequency of heat flow in an elementary volume of the part,
a heat admittance system,
a heat transfer interface, comprising heat transfer interface nodes connected to an ambient air environment model comprising a set of leakage heat conductances,
a connection interface, comprising connection interface nodes connected to at least one other model,
a power multi-source interface, comprising power interface nodes, and
a temperature measurement interface, comprising temperature measurement nodes;

b) reduce each of a plurality of the detailed models into a compact model by controlling the maximum of a heat flow frequency, thereby forming a plurality of compact models;

c) interpolate nodes of at least one of the heat transfer interface, connection interface, power multi-source interface, and temperature measurement interface of at least one of the detailed models and for coupling of at least two of the plurality of compact models into a macromodel;

d) form the compact flexible thermal model through reducing the macromodel;

e) explore the electronic system's thermal behavior by iteratively: applying an average power distributed on a surface of the heat transfer interface to at least two of the heat transfer nodes, performing a simulation of the static and dynamic thermal behavior of the compact flexible thermal model on a microprocessor, and measuring a temperature of at least two nodes of the temperature measurement interface; and (f) modify a position of at least one component in the macromodel, wherein an electronic system is manufactured having the static and dynamic thermal behavior of the macromodel specified in the iteration.

8. The device according to claim 7, wherein the coupling of at least two of the detailed models comprises a coupling with constraints, making the detailed models compatible.

9. The device according to claim 7, wherein the interface nodes are reduced by a method of coupling and interpolation between an original face and another simplified 2-dimensional face.

10. The device according to claim 7, wherein a reduction level of more than 80% of at least one of the plurality of detailed model is achieved.

11. The device according to claim 7, wherein the accuracy of the compact and flexible thermal model is controlled with an observation frequency of thermal phenomena of the compact and flexible thermal model, wherein the observation frequency is between 0 and 0.00001 Hz.

12. The device according to claim 7, the microcomputer being further configured to perform a preliminary step for simplifying the geometrical description of at least one of the parts.

13. The device according to claim 7, wherein in case of an unsatisfactory result of the simulation, the device replaces at least one detailed model of at least one part of the electronic system by at least one different detailed model of the at least one part without modifying the detailed model of at least one other part of the system.

14. A device that creates a compact flexible thermal model of an electronic system model including a microcomputer configured to:

a) break down a representation of the system model into parts of the electronic system, each of the parts being in a single material and being represented as a detailed model at least comprising:
a mesh, wherein the size of the mesh of at least one of the parts is defined as a function of a transfer frequency of heat flow in an elementary volume of the part,
a heat admittance system,
a heat transfer interface, comprising heat transfer interface nodes, for connection to an ambient air environment model, wherein the ambient air environment model includes a set of leakage heat conductances,
a connection interface, comprising connection interface nodes, for connection to at least one other model,
a power multi-source interface, comprising power interface nodes, and
a temperature measurement interface, comprising temperature measurement nodes;

b) reduce each of a plurality of the detailed models into a compact model by controlling the maximum of a heat flow frequency, thereby forming a plurality of compact models;

c) interpolate nodes of at least one of the heat transfer interface, connection interface, power multi-source interface, and temperature measurement interface of at least one of the detailed models and the coupling of at least two of the plurality of compact models into a macromodel, the coupling comprising coupling with constraints, making the detailed models compatible;

d) reduce the macromodel to form the compact flexible thermal model;

e) iteratively: apply an average power distributed on a surface of the heat transfer interface to at least two of the heat transfer nodes, perform a simulation of the static and dynamic thermal behavior of the compact flexible thermal model on a microprocessor, and measure a temperature of at least two nodes of the temperature measurement interface; and (f) modify a position of at least one component in the macromodel, wherein an electronic system is manufactured having the static and dynamic thermal behavior of the macromodel specified in the iteration.

15. The device according to claim 14, wherein the computer system carries out a reduction of the interface nodes by a method of coupling and interpolation between an original face and another simplified 2-dimensional face.

16. The device according to claim 14, wherein a reduction level of more than 80% is obtained for at least one of the detailed model.

17. The device according to claim 14, wherein the accuracy of the compact and flexible thermal model is controlled with an observation frequency of thermal phenomena of the compact and flexible thermal model, wherein the observation frequency is between 0 and 0.00001 Hz.

18. The device according to claim 14, the computer system performing a preliminary step for simplifying the geometrical description of at least one of the parts.

19. The device according to claim 14, wherein in case of an unsatisfactory result of the simulation, the device replaces at least one detailed model of at least one part of the electronic system by at least one different detailed model of the at least one part without modifying the detailed model of at least one other part of the system.

* * * * *